US012070861B2

(12) United States Patent
Torabi et al.

(10) Patent No.: US 12,070,861 B2
(45) Date of Patent: Aug. 27, 2024

(54) ROBOTICS FOR THREE-DIMENSIONAL PRINTING

(71) Applicant: 3DEO, Inc., Torrance, CA (US)

(72) Inventors: Payman Torabi, Los Angeles, CA (US); Matthew Petros, Los Angeles, CA (US); Zhuofeng Zhang, Los Angeles, CA (US)

(73) Assignee: 3DEO, Inc., Torrance, CA (US)

( * ) Notice: Subject to any disclaimer, the term of this patent is extended or adjusted under 35 U.S.C. 154(b) by 586 days.

(21) Appl. No.: 17/175,510

(22) Filed: Feb. 12, 2021

(65) Prior Publication Data

US 2021/0316450 A1 Oct. 14, 2021

Related U.S. Application Data

(60) Provisional application No. 63/009,867, filed on Apr. 14, 2020.

(51) Int. Cl.
| | |
|---|---|
| *B25J 9/16* | (2006.01) |
| *B25J 13/08* | (2006.01) |
| *B25J 15/00* | (2006.01) |
| *B29C 64/227* | (2017.01) |
| *B29C 64/393* | (2017.01) |
| *B33Y 30/00* | (2015.01) |
| *B33Y 50/02* | (2015.01) |

(52) U.S. Cl.
CPC ............ *B25J 9/163* (2013.01); *B25J 9/1664* (2013.01); *B25J 9/1697* (2013.01); *B25J 13/089* (2013.01); *B25J 15/0019* (2013.01); *B29C 64/227* (2017.08); *B29C 64/393* (2017.08); *B33Y 30/00* (2014.12); *B33Y 50/02* (2014.12)

(58) Field of Classification Search
CPC ........ B25J 9/163; B25J 9/1664; B25J 9/1605; B25J 9/1671; B25J 9/1697; B25J 13/089; B25J 15/0019; B33Y 30/00; B33Y 50/02; B29C 64/393; B29C 64/227
See application file for complete search history.

(56) References Cited

U.S. PATENT DOCUMENTS

| | | |
|---|---|---|
| 9,056,396 B1 | 6/2015 | Linnell |
| 9,586,315 B2 | 3/2017 | Guerin et al. |

(Continued)

FOREIGN PATENT DOCUMENTS

| | | |
|---|---|---|
| WO | WO-2018026962 A1 | 2/2018 |
| WO | WO-2019157074 A2 | 8/2019 |
| WO | WO-2020086630 A1 | 4/2020 |

OTHER PUBLICATIONS

Co-pending U.S. Appl. No. 17/234,374, inventors Torabi; Payman et al., filed on Apr. 19, 2021.

*Primary Examiner* — Jaime Figueroa
*Assistant Examiner* — Mohamad O El Sayah
(74) *Attorney, Agent, or Firm* — Perkins Coie, LLP

(57) ABSTRACT

The present disclosure provides systems and methods for training a robot. The systems and methods may provide a robotic system. The robotic system may comprise a trainable robot and a sensor. The sensor may be attached to at least one physical tool. The method may comprise using the sensor to capture movement from a user operating the at least one physical tool. The method may include using at least the movement captured to train the robot, such that upon training, the robot may be trained to perform at least the movement.

20 Claims, 26 Drawing Sheets

(56) References Cited

U.S. PATENT DOCUMENTS

| | | |
|---|---|---|
| 9,643,314 B2 | 5/2017 | Guerin et al. |
| 9,987,682 B2 | 6/2018 | Torabi et al. |
| 10,737,323 B2 | 8/2020 | Torabi et al. |
| 10,792,731 B2 | 10/2020 | Torabi et al. |
| 2009/0132088 A1 | 5/2009 | Taitler |
| 2016/0257000 A1* | 9/2016 | Guerin ................... B25J 9/1671 |
| 2017/0165841 A1* | 6/2017 | Kamoi ................... B25J 9/1671 |
| 2018/0348744 A1* | 12/2018 | Cortsen ................ G05B 19/423 |
| 2019/0160662 A1* | 5/2019 | Satou ....................... B25J 9/163 |
| 2019/0329322 A1* | 10/2019 | Preston ................ B29C 64/386 |
| 2019/0344493 A1* | 11/2019 | Amano ................... G06T 7/001 |
| 2019/0358907 A1* | 11/2019 | Starkey ................ B29C 64/118 |
| 2020/0122325 A1* | 4/2020 | Iwasa ..................... B25J 9/0081 |
| 2020/0122327 A1* | 4/2020 | Hazan ................... B25J 9/1605 |
| 2020/0130178 A1* | 4/2020 | Colasanto .......... G05B 19/4155 |
| 2021/0016501 A1 | 1/2021 | Petros et al. |
| 2021/0023694 A1* | 1/2021 | Chen ..................... B25J 9/0081 |
| 2021/0069783 A1 | 3/2021 | Torabi et al. |
| 2021/0205886 A1 | 7/2021 | Torabi et al. |
| 2022/0092330 A1* | 3/2022 | Amano ..................... G06T 7/75 |

* cited by examiner

ROBOTICS FOR THREE-DIMENSIONAL PRINTING

CROSS-REFERENCE

This application claims priority to U.S. Provisional Patent Application No. 63/009,867, filed on Apr. 14, 2020, which is entirely incorporated herein by reference.

STATEMENT REGARDING FEDERALLY SPONSORED RESEARCH

This invention was made with government support under grant no. 1757478 awarded by the National Science Foundation. The government has certain rights in the invention.

BACKGROUND

Robotic systems may be found in a variety of fields of manufacturing. Robotic systems can perform complex, intricate, repetitive, or dangerous tasks. A properly programmed robotic system can complete a number of operations in a precise and repeatable sequence. However, conventional robotic systems may lack the capability to be programmed quickly or easily to perform such operations. Additionally, as the complexity of the desired operation increases, the time needed to program the robotic system may also increase.

SUMMARY

A need is recognized herein for methods and systems that can quickly program or train a robotic system. In addition, as robotic systems capable of utilizing physical tools increase their utility, there is a need to efficiently program robotic systems to effectively harness physical tools. Further, as robotic systems are capable of performing complex, intricate, repetitive tasks, they can be well-suited to be used in three-dimensional (3D) printing. 3D printed objects (e.g., 3D printed parts, 3D printed green parts, etc.) generated from 3D printing may require precise tool handling and manipulation as they can vary in size and dimension, from project to project. As a result, the programming of a robotic system capable of precise tool handling can require significant programming depending on the 3D printed object at hand. The present disclosure provides systems and methods that are configured to train (e.g., program) a robot quickly to effectively handle physical tools much like a human user for the manipulation of 3D printed objects.

In an aspect, the present disclosure provides a method for training a robot, comprising: (a) providing a robotic system comprising a trainable robot and a sensor, wherein the sensor is attached to at least one physical tool; (b) using the sensor to capture movement from a user operating the at least one physical tool; and (c) using at least the movement captured in (b) to train the robot, such that upon training, the robot is trained to perform at least the movement.

In some embodiments, the sensor comprises a motion tracker.

In some embodiments, the user operates the at least one physical tool, and the motion tracker captures the movement.

In some embodiments, the robotic system further comprises a base station.

In some embodiments, the base station tracks the movement of the motion tracker.

In some embodiments, the robotic system further comprises a virtual reality environment that processes motion data corresponding to the movement.

In some embodiments, the virtual reality environment comprises a virtual reality coordinate system.

In some embodiments, the motion tracker or base station transmits the motion data to the virtual reality environment.

In some embodiments, the virtual reality coordinate system is mapped to a physical robotic coordinate system.

In some embodiments, the motion data is mapped to the physical robotic coordinate system.

In some embodiments, in (c), the robot performs the at least the movement in the physical robotic coordinate system.

In some embodiments, the at least one physical tool is selected from the group consisting of a brush, gas blower, hammer, blade, spoon, metal file, fish scaler, saw, scissors, wire scraper, drill, pliers, heat gun, screwdriver, and wire stripper.

In some embodiments, the robotic system further comprises a virtual reality (VR) environment comprising a VR coordinate system, wherein the sensor transmits the movement for processing in the VR environment.

In another aspect, the present disclosure provides a robotic system for handling physical tools, comprising: (a) a robotic system comprising a sensor and a robot configured to be trainable, wherein the sensor is attached to at least one physical tool; (b) a sensor configured to capture movement from a user operating the at least one physical tool; and (c) a virtual reality environment configured to process and provide at least the movement captured in (b) to train the robot, such that upon training, the robot is configured to perform at least the movement.

In another aspect, the present disclosure provides a system for training a robot, comprising: a sensor configured to be disposed on a physical tool, which sensor is configured to obtain data defining a movement of the physical tool; and memory comprising machine-executable instructions that, upon execution by the one or more computer processors communicatively coupled to the sensor and the robot, cause the one or more computer processors to (a) receive the data from the sensor and (b) train the robot to perform the movement using at least the data.

In another aspect, the present disclosure provides a method for forming a 3D printed object. The method may include obtaining one or more images of a 3D printed object. The method may include overlaying at least a portion of a computer model of the 3D printed object on the one or more images of the 3D object. The method may also include using a VR trained robot to use one or more tools on the 3D printed object. In some cases, the at least a portion of a computer model of the 3D printed object comprises a cap region of the 3D printed object. In some cases, the cap region may be generated based on the computational geometry of the 3D printed object. In some cases, the cap region may be generated based on the cross-section of a computer model of the 3D printed object.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1A:
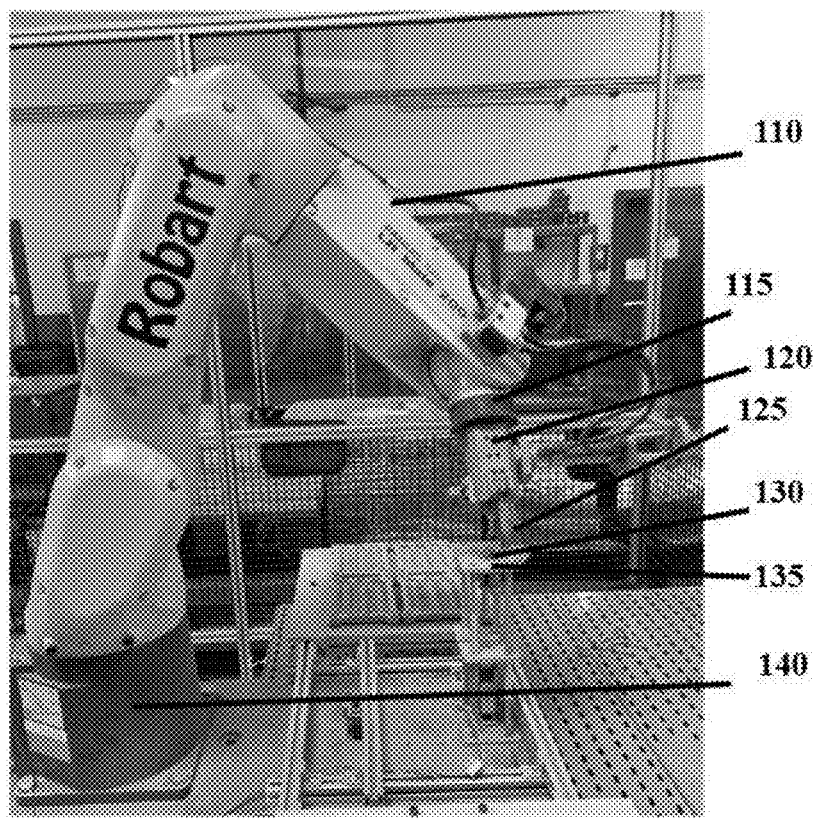
FIG. 1A and FIG. 1B illustrate a robot operating a physical tool, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Three-dimensional printing (3D printing) may refer to a process of forming a three-dimensional object. To form a three-dimensional object, multiple layers of a powder material may be layered sequentially adjacent to one another. The layers of powder material may be heated, cured, or chemically treated, individually or at the same time, so that particles of the powder material fuse or melt together.

The term "adjacent" or "adjacent to," as used herein, generally refers to 'next to', 'adjoining', 'in contact with,' or 'in proximity to.' Adjacent to may refer to one feature, such as a layer, being 'above' or 'below' another feature, such as another layer. A first layer adjacent to a second layer may be in direct contact with the second layer, or there may be one or more intervening layers between the first layer and the second layer.

The term "powder," as used herein, generally refers to a solid having particles, such as fine particles. A powder material may be a powder of a polymer, a metal, a metal alloy, a ceramic, a cermet, or any combination thereof. A powder material may comprise a solid, a liquid, a gel, or any combination thereof. A powder material may comprise stainless steel, bronze, steel, gold, nickel, nickel steel, aluminum, titanium, carbon fiber, carbon nanotubes, graphene, graphene embedded in plastic, nitinol, water-absorbing plastic, plastic, sand, conductive carbomorph, paper, concrete, food, yarn, or any combination thereof. A powder material may be coated by a coating, such as coating by plastic, an organic material, or any combination thereof. In some cases, the powder material may comprise metal particles. In some cases, the powder material may comprise gold particles. In some cases, the powder material may comprise stainless steel particles. The stainless steel particles may comprise metal injection molding (MIM) grades of stainless steel. The stainless steel particles may be 316 L, 17-4 PH, 430L, 440C, 310S, 420J, or 904L grade. A powder material may comprise H13 steel, S7 steel, inconel alloys, MIM alloys, titanium, sand, or ceramic. The stainless steel particles may be MIM grade 17-4 PH. The powder material may comprise carbon, manganese, phosphorus, sulfur, silicon, chromium, nickel, copper, niobium, or iron. The powder material may comprise chromium, nickel, copper, niobium, or iron. A powder material may comprise a flow agent to ensure the powder maintains a free-flow behavior during processing. A flow agent may be fumed silica. The flow agent may be hydrophobic. The flow agent may be hydrophilic. Agents may be added to the powder material to change the absorption property, such as the absorption of water. In some cases, an agent may be added to decrease the absorption of water. In some cases, an agent may be added to increase the absorption of water.

The term "layer," as used herein, refers to a layer of atoms or molecules on a surface, such as a substrate. In some cases, a layer includes an epitaxial layer or a plurality of epitaxial layers (or sub-layers). A layer generally has a thickness from about one monoatomic monolayer (ML) to tens of monolayers, hundreds of monolayers, thousands of monolayers, millions of monolayers, billions of monolayers, trillions of monolayers, or more. In an example, a layer is a multilayer structure having a thickness greater than one monoatomic monolayer. In addition, a layer may include multiple material layers.

The term "support," as used herein, generally refers to any work piece on which a material used to form a 3D object, is placed on. The 3D object may be formed directly on the base, directly from the base, or adjacent to the base. The 3D object may be formed above the base. The support may be a substrate. The support may be disposed in an enclosure (e.g., a chamber). The enclosure can have one or more walls formed of various types of materials, such as elemental metal, metal alloy (e.g., stainless steel), ceramics, or an allotrope of elemental carbon. The enclosure can have shapes of various cross-sections, such as circular, triangular, square, rectangular, or partial shapes or a combination thereof. The enclosure may be thermally insulated. The enclosure may comprise thermal insulation. The enclosure may provide thermal or environmental insulation. The base can comprise an elemental metal, metal alloy, ceramic, allotrope of carbon, or polymer. The base can comprise stone, zeolite, clay or glass. The elemental metal can include iron, molybdenum, tungsten, copper, aluminum, gold, silver or titanium. A metal alloy may include steel (e.g., stainless steel). A ceramic material may include alumina. The base can include silicon, germanium, silica, sapphire, zinc oxide, carbon (e.g., graphite, Graphene, diamond, amorphous carbon, carbon fiber, carbon nanotube or fullerene), SiC, AN, GaN, spinel, coated silicon, silicon on oxide, silicon carbide on oxide, gallium nitride, indium nitride, titanium dioxide, aluminum nitride. In some cases, the base comprises a susceptor (i.e., a material that can absorb electromagnetic energy and convert it to heat). The base, substrate and/or enclosure can be stationary or translatable.

The term "about" when referring to a number or a numerical range generally means that the number or numerical range referred to is an approximation within experimental variability (or within statistical experimental error), and thus the number or numerical range may vary from, for example, between 1% and 15% of the stated number or numerical range.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Overview

Robotic systems may be found in a variety of different manufacturing environments. Utilizing robots as described herein for tool handling in 3D printing and for manipulating/handling 3D printed objects can increase part production, reduce costs, and minimize human capital, among other advantages.

Conventional robotic systems may be typically programmed (e.g., trained) to handle tools via direct programming (e.g., line by line coding). This may lead to handling of tools by the robotic system to be particular and not adaptable to a variety of different 3D printed objects, reducing the overall effectiveness of the robotic system. Through the use of virtual reality programming, can a robotic system be quickly trained to handle physical tools much like a human user on any object. Virtual reality programming allows for training of a robotic system to operate a physical tool to be directly translated from a human user operating a physical tool. This can be done by capturing the motion data of the human movement and translating the motion data to the robotic system. This can allow for a robot to replicate the exact motion required to perform a necessary operation without the need of direct programming. Virtual reality programming allows for faster and more efficient programming of a robotic system to perform a task or handle a particular tool with respect to an object.

I. Robotic System

Figure 1B:
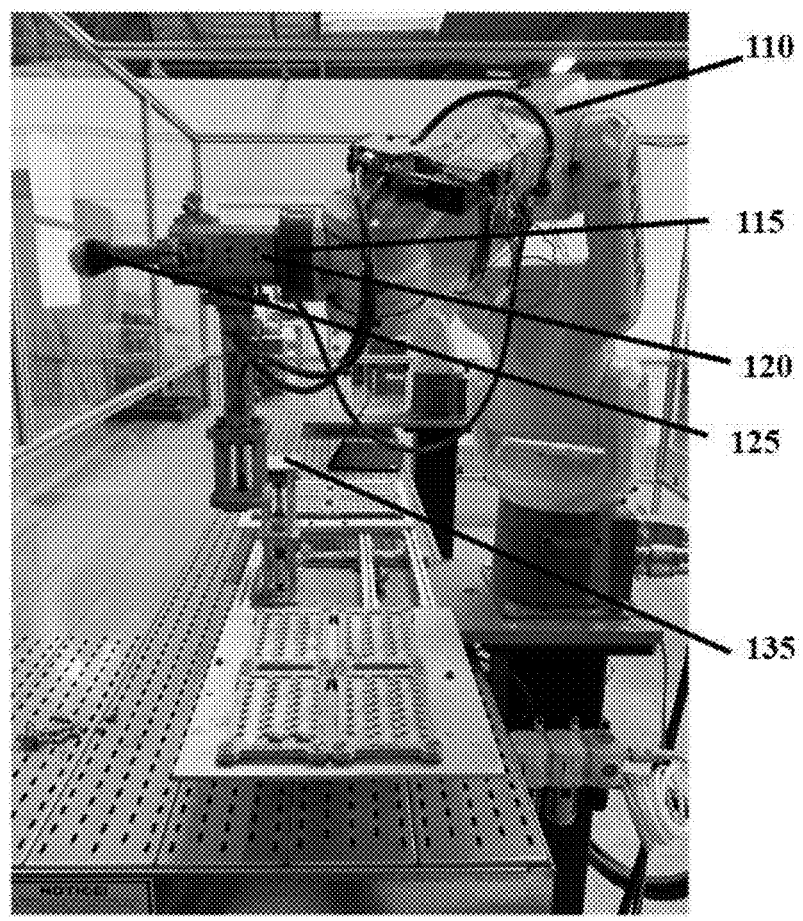

In an aspect, the present disclosure provides a method for training a robot. The method may comprise providing a robotic system. The robotic system may include a robot. The robot may be a robotic arm. The robotic arm may be the sum total of the robot. The robotic arm may be part of a robot. The robot may be, for example, a cartesian robot, gantry robot, cylindrical robot, spherical robot, polar robot, SCARA robot, articulated robot, parallel robot, or anthropomorphic robot, etc. The robot may be a custom robot. As shown in FIG. 1A and FIG. 1B, the robot may be a robotic arm 110. The robotic may be attached to a base 135. The base may be stationary. The base may be moveable.

The robotic system (e.g., robot, robotic arm) may have a variety of parameters that may be adjusted. The parameters may be, for example, the number of axes, joints, degrees of freedom, working envelope, kinematics, carrying capacity or payload, speed, acceleration, accuracy, repeatability, etc. The variety of parameters may be adjusted depending on the operation. The variety of parameters may be adjusted depending on the 3D printed object at hand. The operation may be as described elsewhere herein.

The robot or a portion thereof (e.g., an arm) may rotate about an axis. The robot or portion thereof may rotate at least 1, 2, 3, 5, 15, 20, 30, 40, 50, 60, 70, 80, 90, 100, 110, 120, 150, 180, 210, 240, 270, 300, 330, 360, 720 or more degrees about the axis. The robot or portion thereof may rotate at most about 720, 360, 330, 300, 270, 240, 210, 180, 150, 120, 110, 100, 90, 80, 70, 60, 50, 40, 30, 20, 15, 10, 5, 3, 2, 1, or less. The robot or portion thereof may rotate from about 1 to 720 degrees, 1 to 360 degrees, 1 to 330 degrees, 1 to 300 degrees, 1 to 270 degrees, 1 to 240 degrees, 1 to 210 degrees, 1 to 180 degrees, 1 to 150 degrees, 1 to 120 degrees, 1 to 90 degrees, 1 to 60 degrees, 1 to 30 degrees, 90 to 720 degrees, 90 to 360 degrees, 90 to 330 degrees, 90 to 300 degrees, 90 to 270 degrees, 90 to 240 degrees, 90 to 210 degrees, 90 to 180 degrees, 90 to 150 degrees, 90 to 120 degrees, 180 to 720 degrees, 180 to 360 degrees, 180 to 330 degrees, 180 to 300 degrees, 180 to 270 degrees, 180 to 240 degrees, or 180 to 210 degrees.

The robot may have a degree of freedom parameter. The robot may have any number of degrees of freedom. The degree of freedom may refer to the freedom of movement of the robot in three-dimensional space. The number of degrees of freedom may be equal to the total number of independent displacements or aspects of motion. The robot may be able to change position. For example, the robot may be capable of moving forward, backwards, up, down, left, and right translation in three perpendicular axes. The degrees of freedom of the robot may be at least about 1, 2, 3, 4, 5, 6, 7, 8, 9, 10, 15, 20, or more. The degrees of freedom of the robot may be at most about 20, 15, 10, 9, 8, 7, 6, 5, 4, 3, 2, or less. The degrees of freedom of the robot may be from about 1 to 20, 1 to 10, 1 to 6, 1 to 3, 3 to 20, 3 to 10, 3 to 6, 6 to 20, or 6 to 10.

The robot may have a working envelope parameter. The robot may have a working envelope of any distance. The working envelope may be the region of space the robot may reach. The working envelope may be dependent on the capability of the robot to move from the reference frame of the robot. The working envelope may be constant. The distance of the working envelope may be at least about 1 millimeter (mm), 10 mm, 10 centimeters (cm), 100 cm, 500 cm, 10 meters (m), 100 m, or more. The distance of the working envelope may be at most about 100 m, 10 m, 500 cm, 100 cm, 10 cm, 10 mm, 1 mm. or less. The distance of the working envelope may be from about 1 mm to 100 m, 1 mm to 1 m, or 1 mm to 10 cm.

The robot may have a carrying capacity parameter. The carrying capacity may be how much the robot can lift. The robot may be capable of lifting objects with a mass of at least about 0.001 kilograms (kg), 0.01 kg, 0.1 kg, 1.0 kg, 10 kg, 100 kg, 1000 kg, 10000 kg, 100000 kg, or more. The robot may be capable of lifting objects with a mass of less than about 100000 kg, 10000 kg, 1000 kg, 100 kg, 10 kg, 1 kg, 0.01 kg, 0.001 kg, or less. The robot may be capable of lifting objects with a mass from about 0.01 kg to 100000 kg, 0.1 kg to 10000 kg, or 1 kg to 100 kg.

The robot may have any type of kinematics. The kinematics of the robot may be the arrangement of rigid members and joints of the robot. The kinematics may be used to determine the possible motions of the robot. The robot may have any number of moveable joints. The number of joints may be used to determine the kinematics of the robot. The robot may have at least about 1, 2, 3, 4, 5, 6, 7, 8, 9, 10, or more moveable joints. The robot may have at most about 10, 9, 8, 7, 6, 5, 4, 3, 2, or less moveable joints. The robot may have from about 1 to 10, 1 to 6, 1 to 3, 3 to 10, 3 to 6, 3 to 4, 6 to 10, or 6 to 8 moveable joints.

The robot may have a speed parameter. The speed may be how fast the robot can position the end of its arm. The speed of the robot may relate to the angular or linear speed of each axis or as a compound speed (e.g., speed of the end of the arm when all axes are moving). The speed of the robot may be the speed at which the robot may move a tool through space. The speed of the robot may be at least about 0.001 meters per second (m/s), 0.01 m/s, 0.1 m/s, 1 m/s, 5 m/s, 10 m/s, 100 m/s, or more. The speed of the robot may be at about 100 m/s, 10 m/s, 5 m/s, 1 m/s, 0.1 m/s, 0.001 m/s. The speed of the robot may be from about 0.001 m/s to 100 m/s, 0.01 m/s to 10 m/s, or 0.1 m/s to 1 m/s. The speed may be how fast the robot can move among any degree of freedom.

The robot may have an accuracy parameter. The accuracy may be how closely the robot can reach a programmed position. The accuracy may relate to how closely the robot performs the motion data acquired from the virtual reality system. The accuracy may be measured using the absolute position of the robot in comparison to the programmed position. The accuracy may be improved with external sensing. The accuracy of the robot may vary with speed and/or position. The accuracy may be adjusted by calibration. The accuracy parameter may be as described in international organization for standardization (ISO) 9283.

The robot may have a repeatability parameter. The repeatability parameter may be how well the robot will return to a programmed position. For example, the robot may be programmed to move to a certain X-Y-Z position. The robot may be within 1 mm of that position. If that position is programmed into controller memory and each time the robot is sent there it returns to within 0.1 mm of the programmed position, then the repeatability will be within 0.1 mm. The repeatability parameter may be as described in international organization for standardization (ISO) 9283.

The robot may have a compliance parameter. The compliance parameter may be a measure of the amount in angle or distance that the axis of the robot will move when a force may be applied to the robot. The angle may be at least about 0 degrees, 5 degrees, 10 degrees, 20 degrees, 30 degrees, 40 degrees, 50 degrees, 60 degrees, 70 degrees, 80 degrees, 90 degrees, 120 degrees, 150 degrees, 180 degrees, 210 degrees, 240 degrees, 270 degrees, 300 degrees, 330 degrees, 360 degrees, or more. The angle may be from about 360 degrees, 330 degrees, 300 degrees, 270 degrees, 240 degrees, 210 degrees, 180 degrees, 150 degrees, 120 degrees, 90 degrees, 80 degrees, 70 degrees, 60 degrees, 50 degrees, 40 degrees, 30 degrees, 20 degrees, 10 degrees, 5 degrees, or less. The angle may be from about 0 degrees to 360 degrees, 10 degrees to 300 degrees, 20 degrees to 210 degrees, 30 degrees to 180 degrees, or 40 degrees to 120 degrees.

The robot may have a power source. The robot may be powered by electricity, such as from a power grid or a portable power generator. The robot may be battery-powered. The robot may use electric motors for movement. The robot may use hydraulic actuators for movement. The robot may have a drive system. The drive system may be used to move any component of the robot. The drive system may be an electric drive system, hydraulic drive system, and/or pneumatic drive system. The robot may connect electric motors to the joints via gears. The robot may connect a motor to the joint directly. The robot may comprise a light source.

The robot may comprise a virtual reality system for programming of the robot as described elsewhere herein. The robot may be also programmed with positional commands, teach pendant, lead-by-the-nose, offline programming, robot simulation tools, etc.

The robot may have an end effector. The end effector may be a device at the end of a robotic arm. The end effector may be designed to interact the environment. The end effector may be used to operate on a 3D object. The end effector may be a physical tool as described elsewhere herein.

The robot may move in any number of axes. The robot may move in at least about 1, 2, 3, 4, 5, 6, 7, 8, 9, 10, 15, 20, 50, 100 or more axes. The robot may move in at most about 100, 50, 20, 15, 10, 9, 8, 7, 6, 5, 4, 3, 2, or less. The robot may move in from about 1 to 20, 1 to 10, 1 to 6, 1 to 3, 3 to 20, 3 to 10, 3 to 6, 6 to 20, or 6 to 10 axes. The robot may be a one-axis robot, two-axis robot, three-axis robot, four-axis robot, five-axis robot, six-axis robot, seven-axis robot, eight-axis robot, nine-axis robot, or may be a robot having an axis greater nine.

The robot may move in one axis. A one-axis robot may, for example, pick up an object (e.g., tool, 3D printed object) and move the object along a straight line. A one-axis robot may, for example, rotate from left to right or vice-versa. The sweeping motion may extend the work area of the robot to include the area on either side of the robot or behind the robot.

The robot may move in two axes. A two-axis robot may, for example, pick up an object (e.g., tool, 3D printed object), lift the object, move the object horizontally and/or vertically, and place the object down. The two-axis robot may perform the actions on a single x/y plane without changing the orientation of the object. The second axis may allow the robot arm to extend forward and backward.

The robot may move in three axes. A three-axis robot may, for example, pick up an object (e.g., tool, 3D printed object), lift the object, move the object horizontally, move the object vertically, and/or set down the object, and set down the object. The three-axis robot may perform the actions in an x/y/z plane without changing the orientation of the object.

The robot may move in four axes. The four-axis robot may, for example, pick up an object (e.g., tool, 3D printed object), lift the object, move the object horizontally, and set down the object. The four-axis robot may perform the actions in an x/y/z plane while changing the object's orientation along one axis (e.g., yaw).

The robot may move in five axes. The five-axis robot may, for example, can pick up an object (e.g., tool, 3D printed object), lift the object, move the object horizontally, and set down the object, etc. The three-axis robot may perform the actions in an x/y/z plane down while changing the orientation of the object along two axes (e.g., yaw and pitch).

Figure 1C:
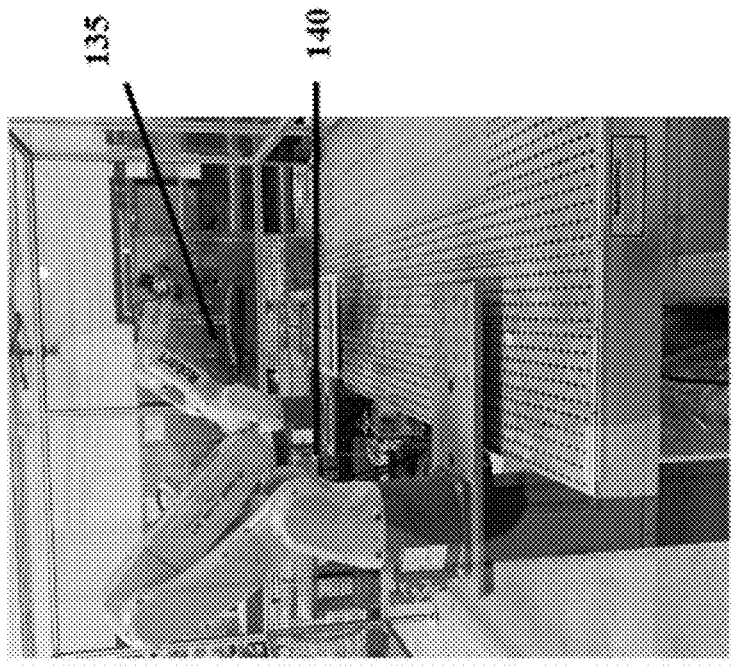
FIG. 1C illustrate two robots for use in handling or operating tools on 3D printed objects, in accordance with some embodiments of the present disclosure.
Figure 1C:
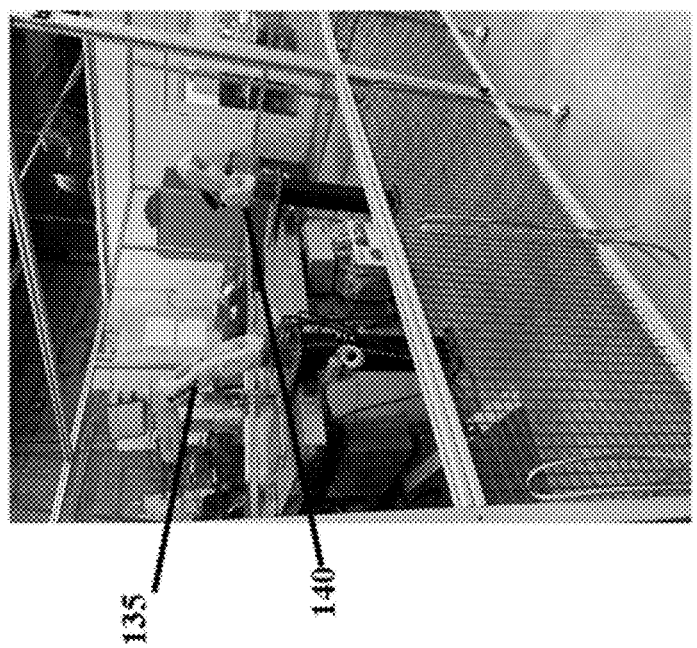

The robot may move in six axes. The six-axis robot may, for example, pick up an object (e.g., tool, 3D printed object), lift the object, move the object horizontally, set the object down. The six-axis robot may perform actions in an x, y, z space. The six-axis robot may perform actions in an x, y, z space and additionally be capable of changing the orientation of the object along three axis (e.g., yaw, pitch, and roll). As shown in FIG. 1A and FIG. 1B, the robot may be a 6-axis robot 110. The robotic system may comprise one or more robots. The robotic system may include at least about 1, 2, 3, 4, 5, 10, 50, 100 more robots. The robotic system may include at most about 100, 50, 10, 5, 4, 3, 2, or less robots. The robotic system may include from about 1 to 100, 1 to 50, 1 to 10, 1 to 5, or 1 to 2 robots. As shown in FIG. 1A, the robotic system may include one robot (110). As shown in FIG. 1C, the robotic system may include two robots (135, 140).

The robot may move in seven axes. The seven-axis robot may remove vibrations created when parts are rotated ISO °. The seven-axis robot may comprise a 6-axis robot and a 1-axis worktable. The robot may move in eight axes. The eight-axis robot may comprise a 6-axis robot and a 2-axis worktable.

Figure 2A:
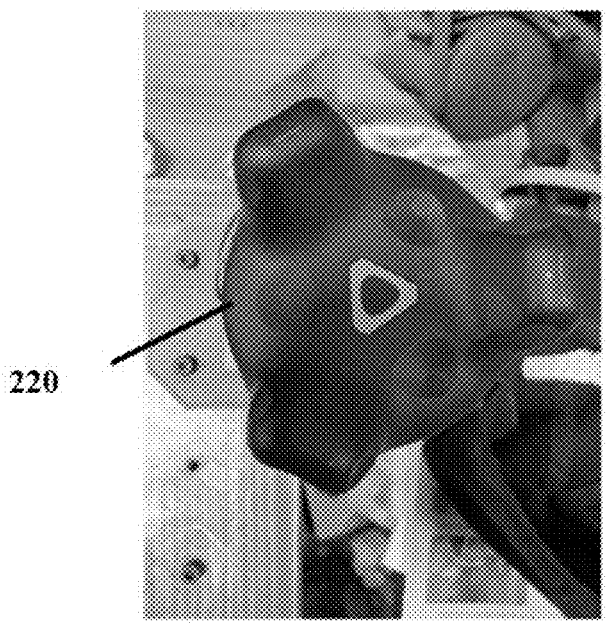
FIG. 2A and FIG. 2B illustrate a motion tracker mounted onto a physical tool and tool holder, in accordance with some embodiments of the present disclosure.
Figure 2B:
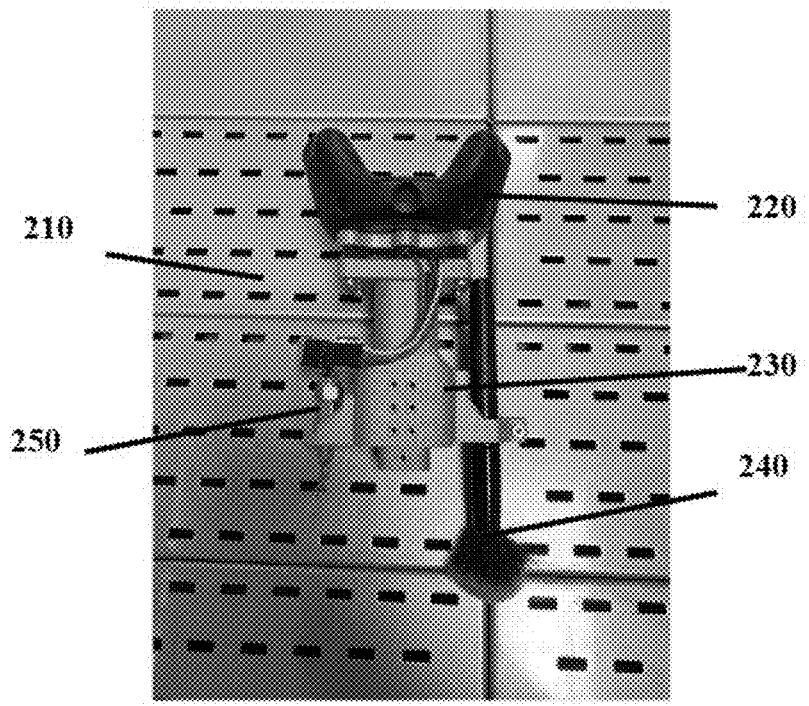

The robotic system may also include a sensor. The sensor may be used to capture movement from a user operating a physical tool. The captured movement and physical tool may be as described elsewhere herein. The sensor may be, for example, a motion tracker, a video camera, a photo camera, an optical-passive unit, an optical-active unit, an inertial measurement unit (IMU), a gyroscope, an accelerometer, or a combination thereof, etc. As shown in FIG. 2A, the sensor may be a motion tracker 220. As shown in FIG. 2B, the motion tracker may be attached to a tool holder 230. FIG. 2A shows 210, the motion tracker attached to the tool holder that may hold a physical tool (240, 250)

The robotic system may include any number of sensors. The robotic system may include at least about 1, 2, 3, 4, 5, 6, 7, 8, 9, 10, 50, 100, or more sensors. The robotic system may include at most about 100, 50, 10, 9, 8, 7, 6, 5, 4, 3, 2, or less sensors. The robotic system may include from about 1 to 100, 1 to 50, 1 to 10, 1 to 5, or 1 to 2 sensors. As shown in FIG. 2B, a single sensor may be attached to tool holder 230. The sensor may be directly attached to a physical tool or a tool holder.

The robotic system may use inertial measurements from a sensor (e.g., IMU in a motion tracker) and light data from a sensor (e.g., light data from the photodiodes in a tracker motion) to determine the pose of the motion tracker. The sensor (e.g., motion tracker) may use photodiodes to measure light pulse timings as a proxy for estimating the horizontal and vertical angles to a lighthouse base station. The sensor may fuse angle measurements from a bundle of the photodiodes to estimate the pose of the tracker. The pose of the motion tracker may be estimated using an angle of arrival measurement.

The sensor may include an inertial measurement unit (IMU). The IMU may provide motion data of the physical tool (e.g., velocity, coordinate location, direction, force, acceleration, etc.). The IMU may be used to maintain a smooth and continuous trajectory of the physical tool. The IMU may provide inertial data. The inertial data may be, for example, linear accelerations, angular velocities, forces, etc. The IMU may be located within the motion tracker. The IMU may be a separate unit from the motion tracker. The sensor may comprise at least about 1, 2, 3, 4, 5, 10 or more IMUs. The sensor may comprise at most about 10, 5, 4, 3, 2, or less IMUs. The sensor may comprise from about 1 to 10, 1 to 5, 1 to 3, 3 to 10, 3 to 5, or 5 to 10 IMUs.

The sensor may be attached to a physical tool. The physical tool may be as described elsewhere herein. The sensor may be directly attached to the physical tool. The sensor may be indirectly attached to the physical tool. In some embodiments, the sensor may be attached to a tool holder. The tool holder may hold the physical tool. As shown in FIG. 2B, the sensor (e.g., motion tracker 220) may be attached to the tool holder 230. The tool holder 230 may hold the tool 240.

Figure 3:
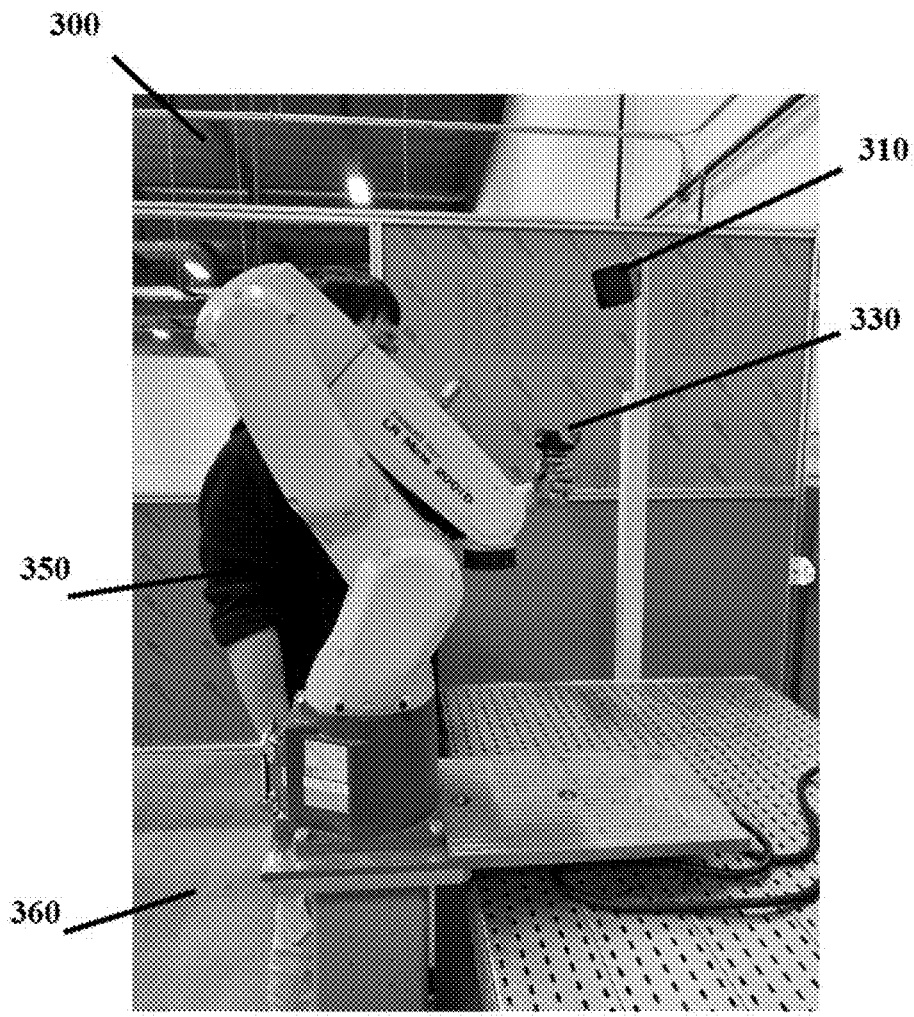
FIG. 3 illustrates the motion tracking set-up of a user operating a physical tool, in accordance with some embodiments of the present disclosure.

The robotic system may include a base station (310), as shown in FIG. 3. The base station may track the movement of the motion tracker 330. The base station may track the movement of the motion tracker using light data. The light data may be, for example, a synchronization flash, infrared sweeping, or a combination thereof, etc. The light data may be emitted by the base station. The base station may use the light data in cycles. The cycle may begin with a synchronization pulse, modulated with low-rate metadata containing calibration parameters for correcting the sweeping plane, followed by an infrared rotating planar laser. The photodiodes of the motion tracker may detect both of these signals. The signals may be used to determine the angle between the normal vector of the base station and the photodiode with the time difference. The laser may rotate at a constant angular velocity. The cycle may occur for a horizontally and a vertically rotating laser. The absolute movement/pose of the tracker can be determined.

The base station (310) may be placed above a general area 360, as shown in FIG. 3. The base station may define the perimeter of the general area 360. The general area 360 may be predefined by a user. The general area may comprise a physical coordinate system where a user may use a physical tool. The general area may contain a user. The general area may contain a robot. The general area may not contain a robot. The robot may be trained in the same general area that the motion data is collected. The robot may not be trained in the same general area that the motion data is collected. The robot may perform the motion data in the same general area that the motion data is collected. The robot may perform the motion data in a different area that the motion data is collected. The user may use the physical tool within the general area, which may produce motion data. The motion data may be captured by the motion tracker and/or base station. The motion data may be used by the robot as described elsewhere herein. The robotic system may comprise at least about 1, 2, 3, 4, 5, 10, or more base stations. The robotic system may comprise at most about 10, 5, 4, 3, 2, or less base stations. The robotic system may comprise 1 to 10, 1 to 5, 1 to 3, 3 to 10, 3 to 5, or 5 to 10 base stations.

The general area may be of any size and dimension. The general area may have a length of any distance. The general area may have a length of at least about 0.1 meters (m), 0.5 m, 1 m, 2 m, 3 m, 4 m, 5 m, 10 m, 15 m, 20 m, or more. The general area may have a length of at most about 20 m, 15 m, 10 m, 5 m, 4 m, 3 m, 2 m, 1 m, 0.5 m, 0.1 m, or less. The general area may have a length of from about 0.1 m to 20 m, 0.1 m to 15 m, 0.1 m to 10 m, 0.1 m to 5 m, 0.1 m to 1 m, 0.1 m to 0.5 m, 1 m to 20 m, 1 m to 10 m, 1 m to 5 m, 1 m to 2 m, 5 m to 20 m, 5 m to 15 m, or 5 m to 10 m. The general area may have a width of any distance. The general area may have a width of at least about 0.1 meters (m), 0.5 m, 1 m, 2 m, 3 m, 4 m, 5 m, 10 m, 15 m, 20 m, or more. The general area may have a width of at most about 20 m, 15 m, 10 m, 5 m, 4 m, 3 m, 2 m, 1 m, 0.5 m, 0.1 m, or less. The general area may have a width from about 0.1 m to 20 m, 0.1 m to 15 m, 0.1 m to 10 m, 0.1 m to 5 m, 0.1 m to 1 m, 0.1 m to 0.5 m, 1 m to 20 m, 1 m to 10 m, 1 m to 5 m, 1 m to 2 m, 5 m to 20 m, 5 m to 15 m, or 5 m to 10 m. The general area may have a height of any distance. The general area may have a height of at least about 0.1 meters (m), 0.5 m, 1 m, 2 m, 3 m, 4 m, 5 m, 10 m, 15 m, 20 m, or more. The general area may have a height of at most about 20 m, 15 m, 10 m, 5 m, 4 m, 3 m, 2 m, 1 m, 0.5 m, 0.1 m, or less. The general area may have a height from about 0.1 m to 20 m, 0.1 m to 15 m, 0.1 m to 10 m, 0.1 m to 5 m, 0.1 m to 1 m, 0.1 m to 0.5 m, 1 m to 20 m, 1 m to 10 m, 1 m to 5 m, 1 m to 2 m, 5 m to 20 m, 5 m to 15 m, or 5 m to 10 m.

The sensor may comprise a motion capture system. The motion capture system may be, for example, Vive, OptiTrack, or VisualEyez, etc.

II. Virtual Reality System

Figure 10:
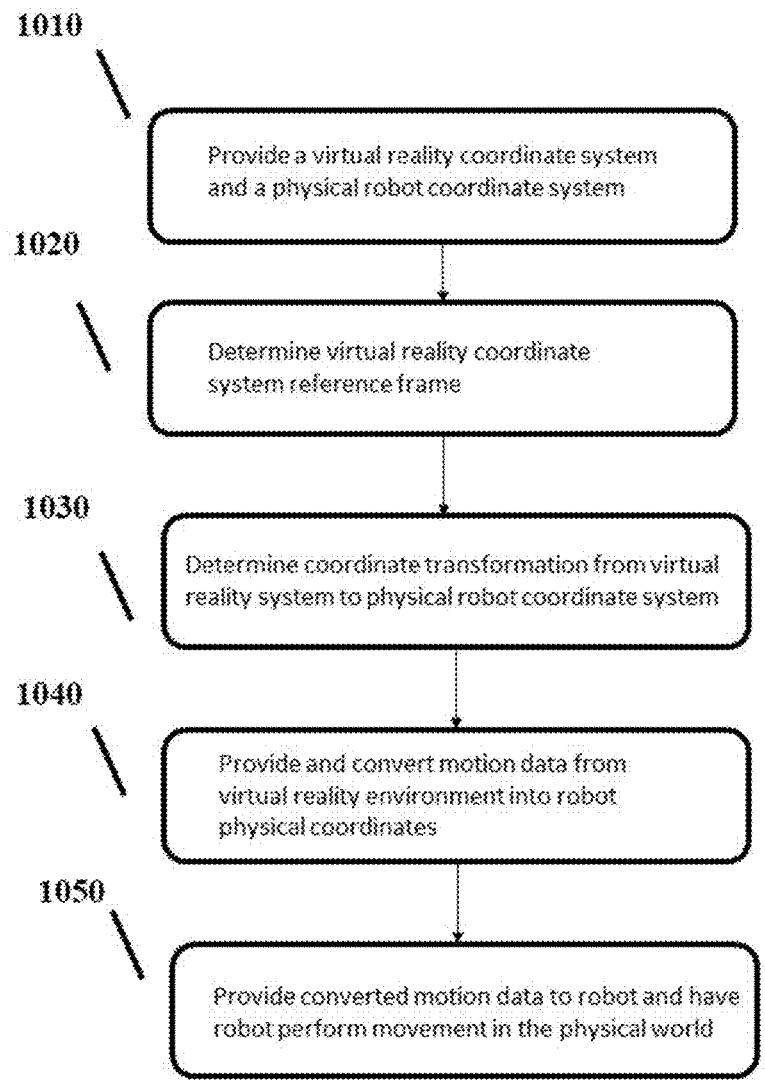
FIG. 10 illustrates a flow diagram for processing motion data in the VR coordinate system to the robotic physical coordinate system, in accordance with some embodiments of the present disclosure.

The robotic system may further comprise a virtual reality environment. The virtual reality environment may be used to process motion data corresponding to the movement of the physical tool. The virtual reality environment may include a virtual reality coordinate system. As shown in FIG. 10, a virtual reality coordinate system may be provided (operation 1010). The virtual reality coordinate system may express the coordinate values in millimeters (mm). The virtual reality coordinate system may express the coordinate values in any unit of measurement (e.g., millimeters, centimeters, meters, etc). The virtual reality (VR) coordinate system may comprise at least about 1, 2, 3, 4, 5, 6, or more coordinate axes. The VR coordinate system may comprise at most about 6, 5, 4, 3, 2, or less coordinate axes. The VR coordinate system may comprise from about 1 to 6, 1 to 5, 1 to 4, 1 to 3, 1 to 2, 2 to 6, 2 to 5, 2 to 4, 2 to 3, 3 to 6, 3 to 5, 3 to 4, or 4 to 5 coordinate axes.

The VR coordinate system may comprise a reference frame. The reference frame may consist of a set of physical reference points that uniquely fix (e.g., locate and orient) the VR coordinate system. The reference frame may be used to standardize measurements within that frame. The VR coordinate system may be provided with a predetermined reference frame. The VR coordinate system may be provided with an unknown reference frame. As shown in FIG. 7, the VR coordinate system may have an unknown reference frame 710.

Figure 11:
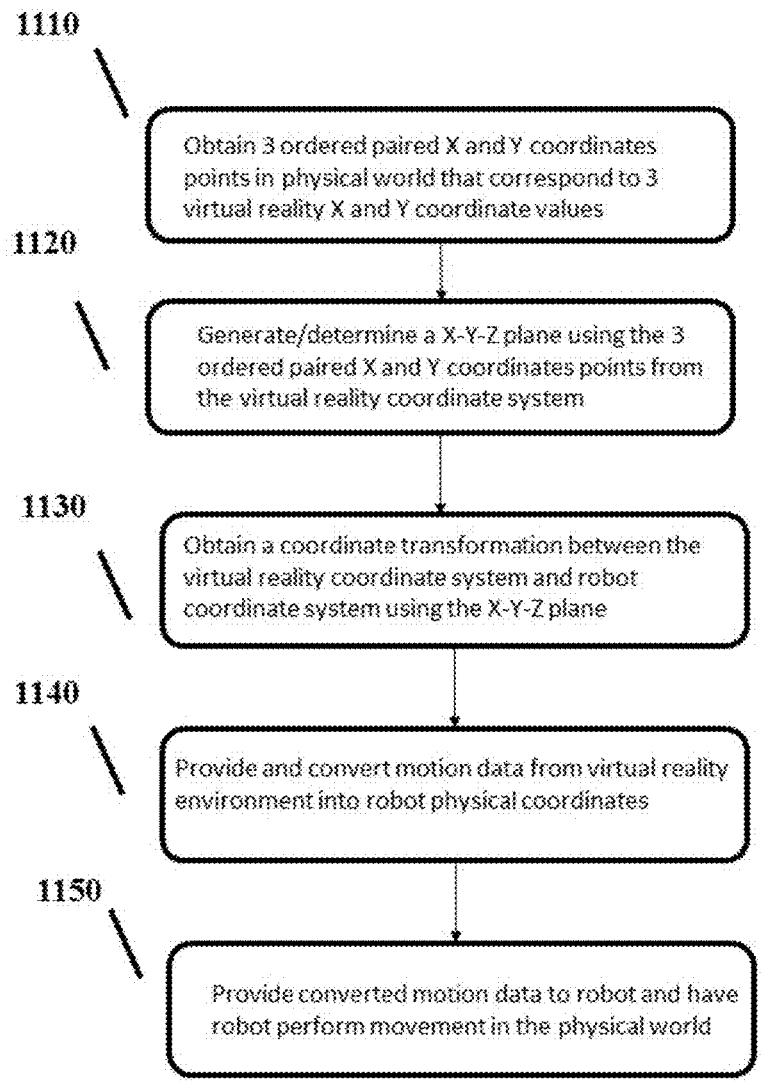
FIG. 11 illustrates determining the reference frame of a VR coordinate system, in accordance with some embodiments of the present disclosure.

As shown in FIG. 10, the reference frame of the VR coordinate system may to be determined (operation 1020). Additionally, a coordinate transformation from the virtual reality coordinate system to the robotic physical coordinate system may be determined (operation 1030). The reference frame and coordinate transformation may be determined as shown in FIG. 11. The reference frame of the VR coordinate may be determined by measuring at least three ordered paired X and Y coordinate points in the physical world (operation 1110). The three ordered paired X and Y coordinate points may correspond to three virtual reality X and Y coordinate values. The three ordered paired X and Y coordinates in the VR coordinate system may be used to determine an X-Y-Z axis plane within the VR coordinate system (operation 1120). The X-Y-Z plane may be used to determine the reference frame 720 for the VR coordinate system.

Each measured X and Y coordinate pair may be an average of any number of measured X and Y coordinate pairs. For example, a single X and Y coordinate pair may be an average of 100 measured X and Y coordinate pairs. A measured X and Y coordinate pair may be averaged by at least about 1, 2, 3, 4, 5, 6, 7, 8, 9, 10, 20, 50, 100, 1000, or more measured X and Y coordinate pairs. The measured X and Y coordinate pair may be averaged by at most about 1000, 100, 50, 20, 10, 9, 8, 7, 6, 5, 4, 3, 2, or less measured X and Y coordinate pairs. The measured X and Y coordinate pairs may be averaged from about 1 to 1000, 1 to 100, 1 to 10, 10 to 1000, 10 to 100, 10 to 20, or 100 to 1000 measured X and Y coordinate pairs.

The robotic system may also comprise a physical robotic coordinate system. As shown in FIG. 7, the robotic physical coordinate system 730 may comprise three axes. The robotic physical coordinate system may comprise any number of axes. The physical robotic coordinate system may have a predefined coordinate system. The physical robotic coordinate system may be specific to a particular robot. The physical robotic coordinate system may vary from robot to robot. The physical robotic coordinate system may be relative to the base the robot. The physical robotic coordinate system may be altered by a user. The physical robotic coordinate system may exist in the general area described elsewhere herein. The physical robotic coordinate system may exist outside the general area. The physical robotic coordinate system may define a general area that a robot may move within. The general area that the robotic system may operate in may be different than the general area that the virtual reality training may occur.

Figure 7A:
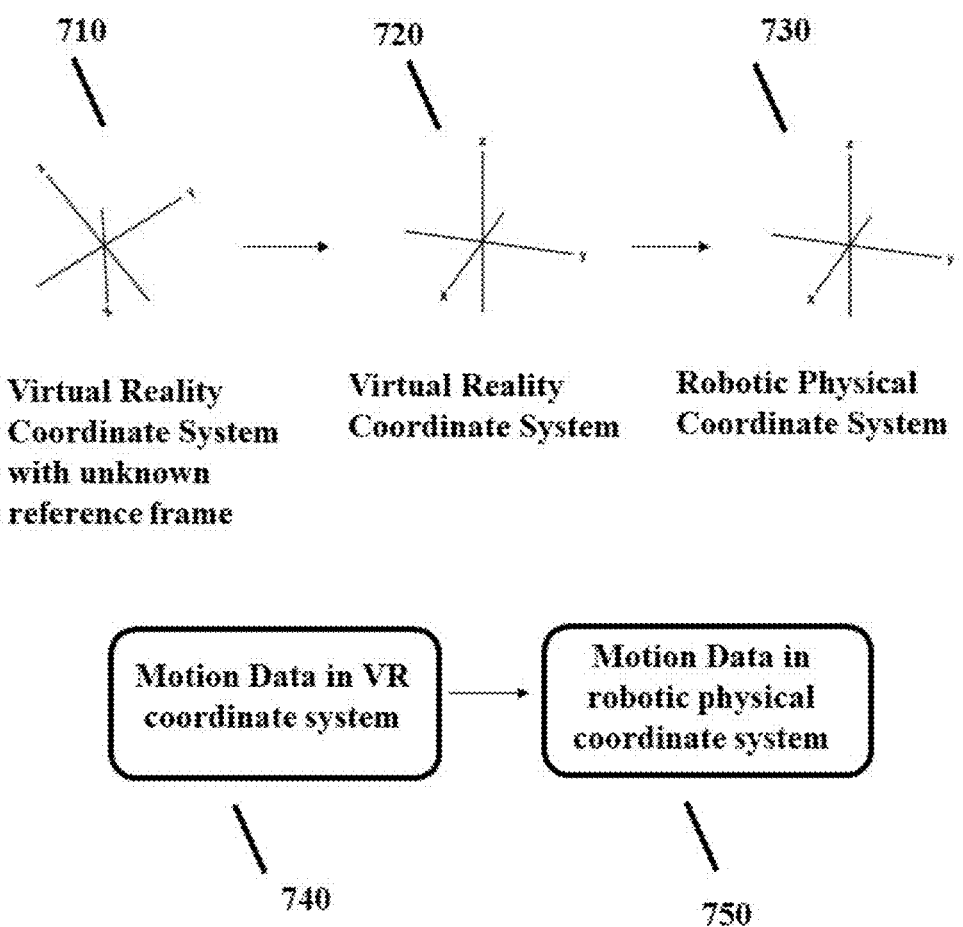
FIG. 7A illustrates a process for converting motion data collected in a virtual reality (VR) coordinate system to the robotic physical coordinate system, in accordance with some embodiments of the present disclosure.
Figure 7B:
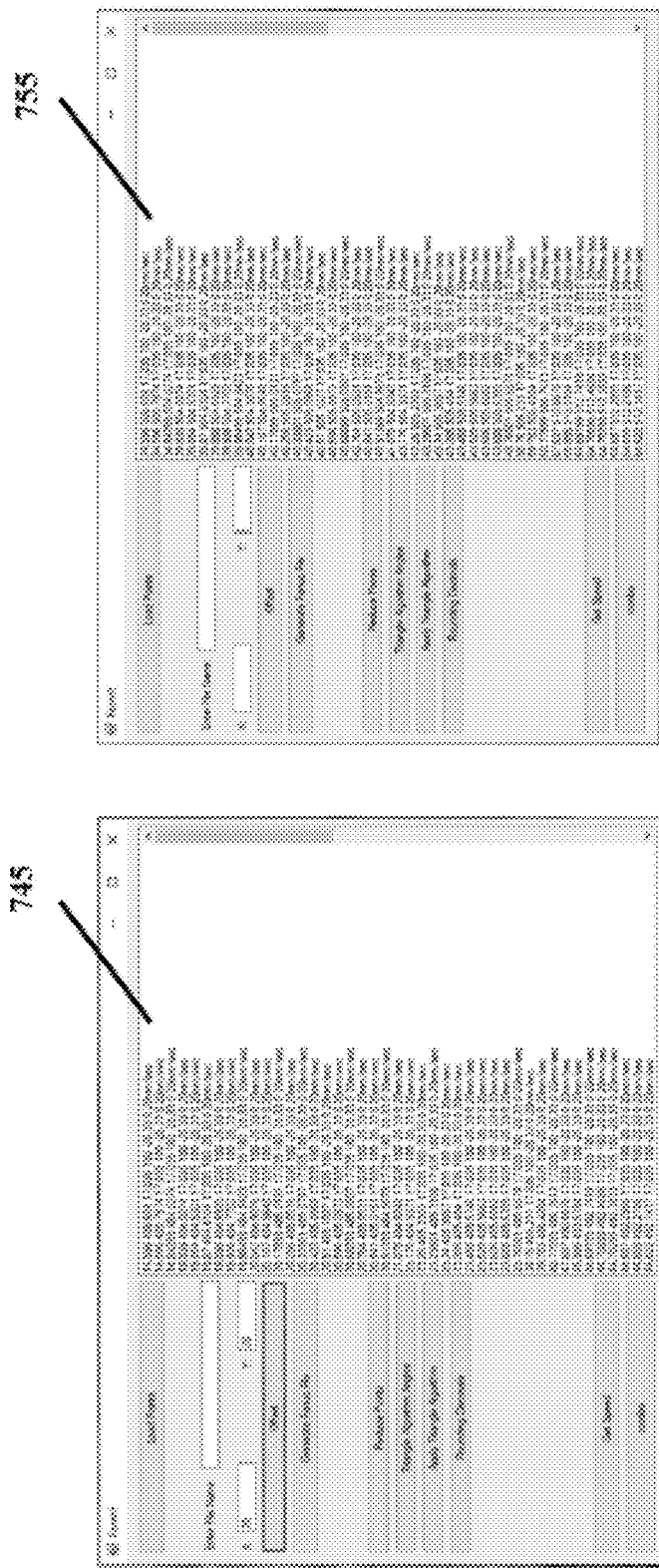
FIG. 7B illustrate motion data collected from the motion tracker in the virtual reality coordinate system converted to the robotic physical coordinate system, in accordance with some embodiments of the present disclosure.

In some embodiments, the generated X-Y-Z axis plane may be used to generate a coordinate transformation between the VR coordinate system and the physical robotic coordinate system (operation 1130). The coordinate transformation may be used to map the virtual reality coordinate system to the physical robotic coordinate system. The coordinate transformation may be used to convert motion data from the virtual reality environment into the physical robotic coordinate system (operation 1140). For example, as shown in FIG. 7A, motion data in the VR coordinate system 740 may be converted into motion data in the robotic physical coordinate system 750. FIG. 7B shows an example of motion data 740 collected by the motion tracker. The motion data may be converted into motion data in the robotic physical coordinate system 755.

In some embodiments, the coordinate transformation may comprise one or more further operations to map the VR coordinate system to the robotic physical coordinate system. The operation may be, for example, a translation, addition, subtraction, multiplication, division, exponentiation, inversion of one or more axes, or a combination thereof, etc. The one or more operations may be used to convert coordinates of the motion data collected in the VR coordinate system to coordinates in the robotic coordinate system.

In some embodiments, a translation operation may be performed on the motion data. For example, a reference coordinate in the virtual reality coordinate system may be 10, 20, 20 (X, Y, Z coordinate respectively). The reference coordinate may be a coordinate from the motion data captured. The corresponding coordinate in the robotic physical coordinate system may be 20, 10, 30. To map each coordinate, the translation operation may add 10, subtract 10, and add 10 to each coordinate in the motion data to map all coordinates in the virtual reality coordinate system to the robotic coordinate system.

Figure 9:
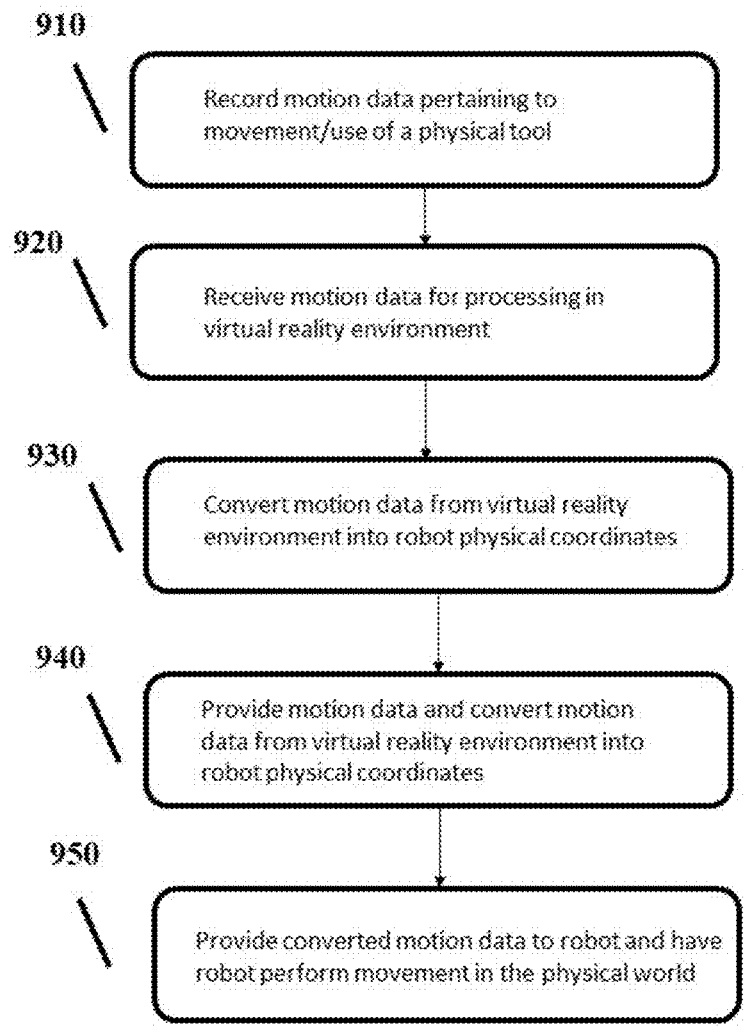
FIG. 9 illustrates a flow diagram for processing motion data for the robot, in accordance with some embodiments of the present disclosure.

The sensor may transmit the movement for processing in the VR environment. As shown in FIG. 9, the virtual reality environment may receive motion data (operation 920). In some cases, the motion tracker and/or base station transmits the motion data to the virtual reality environment. The motion data may pertain to a user using a physical tool as described elsewhere herein. The converted motion data into the physical robotic coordinate system 750 may be used by the robot. The robot may use the motion data to move a physical tool as described elsewhere herein.

III. Physical Tools

The robotic system may comprise one or more physical tools. The physical tool may be a tool that exists in the physical world. The physical tool may be a tool that exists in the physical world as opposed to a virtual tool existing in a virtual reality. The physical tool may be a tool that a user may use in the physical world. The physical tool may be attached to the robotic system. The physical tool may be attached to a tool holder. The tool holder may be attached to the robotic system. As shown in FIG. 1, the physical tool 125 may be attached to a tool holder 120. The tool holder may then be attached to the robotic system at a contact point 115.

Figure 5A:
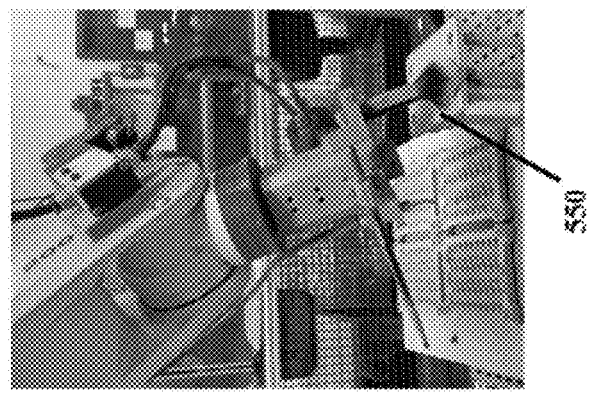
FIG. 5A illustrates a robot operating a physical tool using the motion data provided by the user, in accordance with some embodiments of the present disclosure.
Figure 5A:
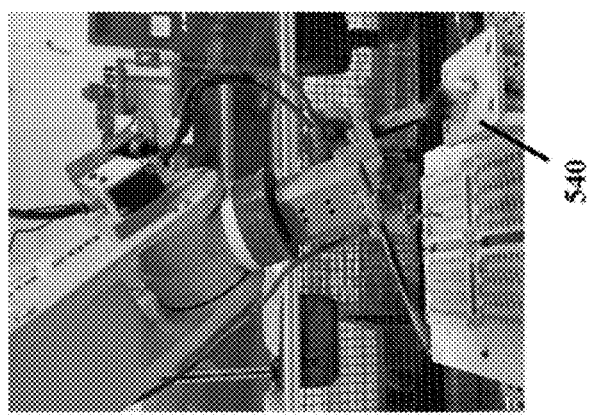
Figure 5A:
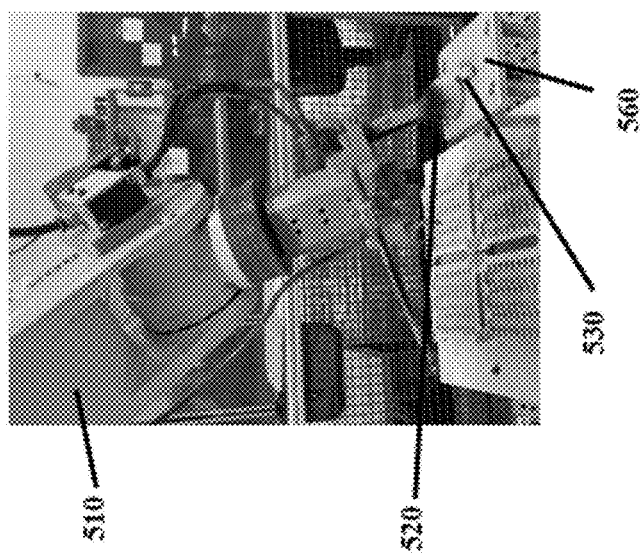
Figure 5B:
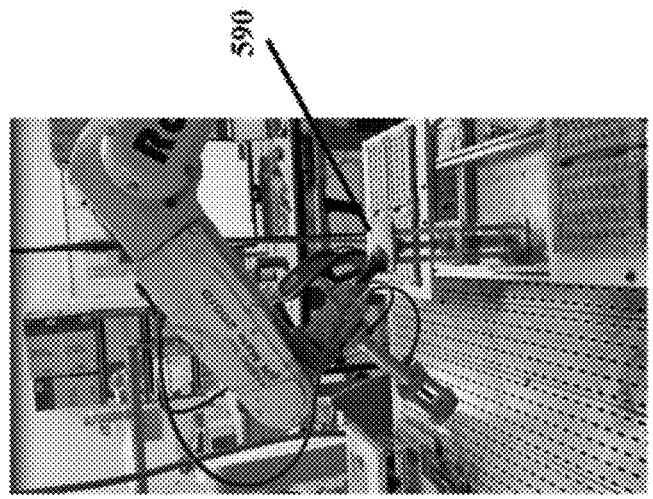
FIG. 5B illustrates a robot operating a physical tool in a three-dimensional space, in accordance with some embodiments of the present disclosure.
Figure 5B:
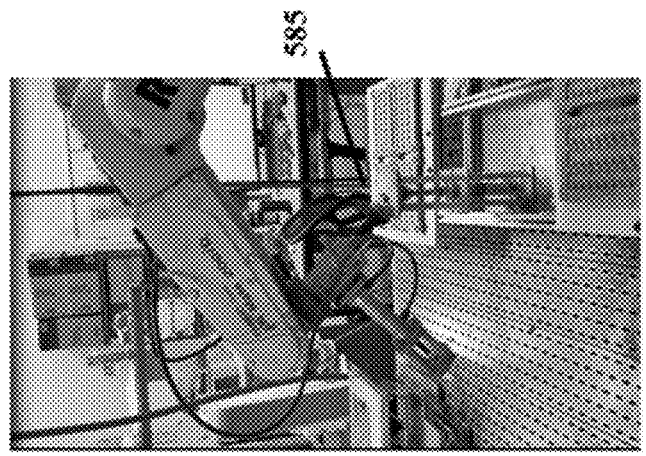
Figure 5B:
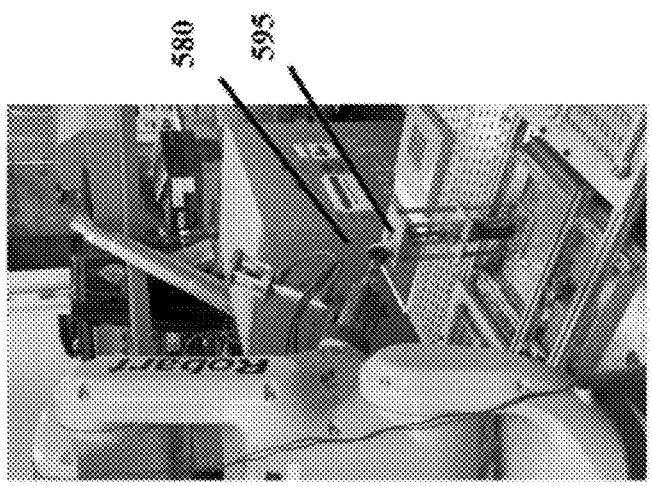
Figure 5C:
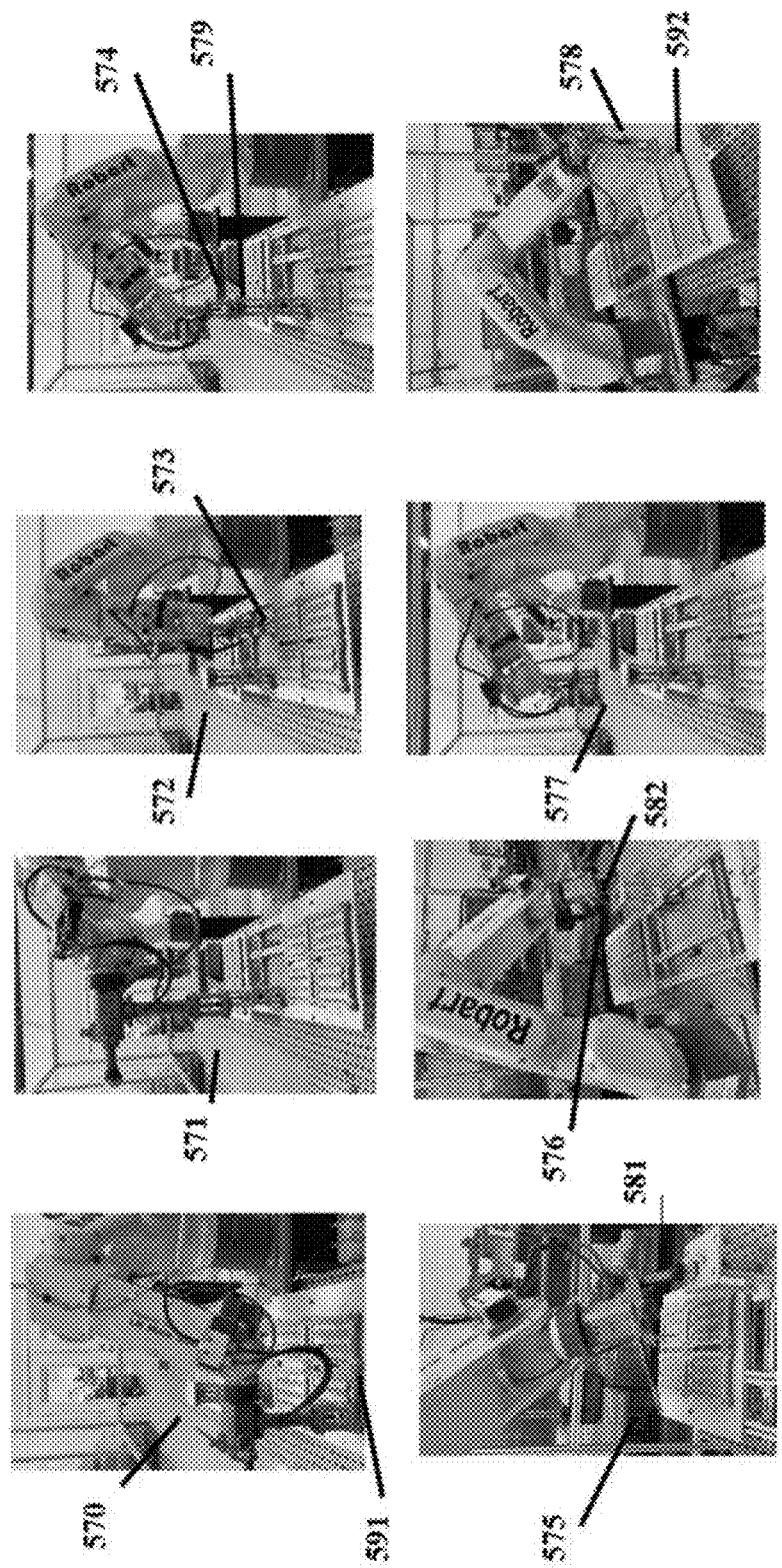
FIG. 5C illustrates a robot operating a variety of actions on a 3D printed object, in accordance with some embodiments of the present disclosure.
Figure 5D:
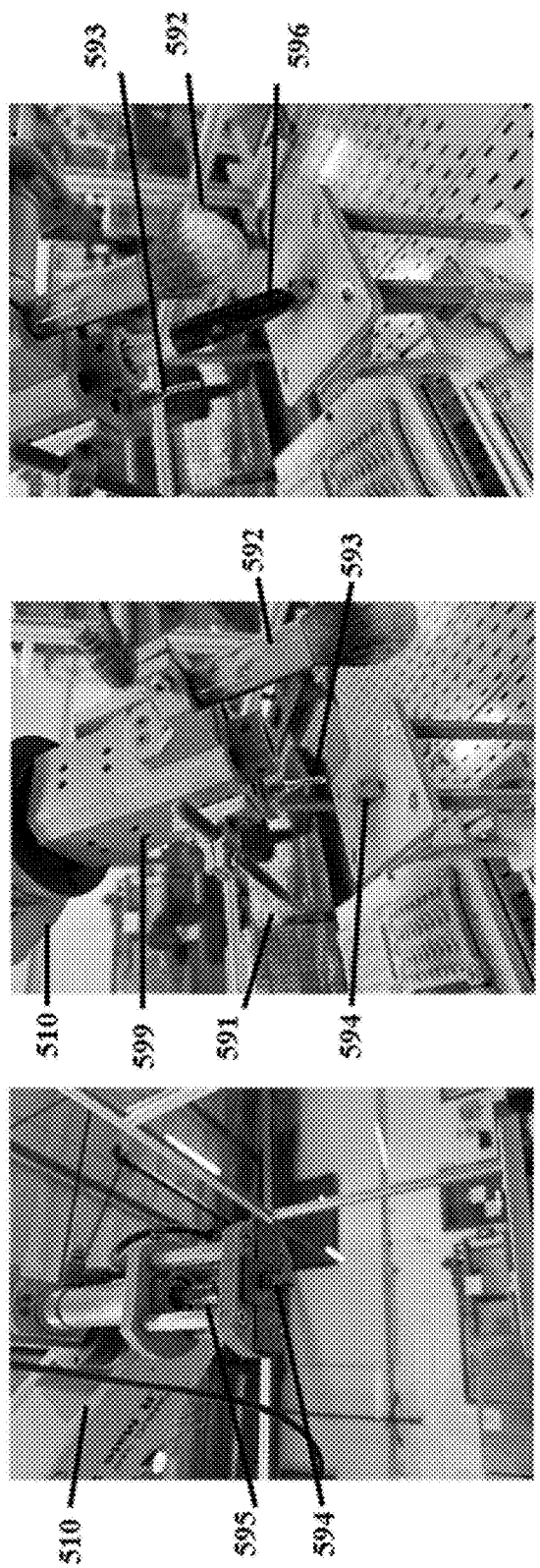
FIG. 5D illustrates a robot operating a variety of physical tools on a 3D printed object, in accordance with some embodiments of the present disclosure.

The robotic system may comprise any number of tools. The robotic system may have a variety of different tools. The robotic system may have any number of the same or different tools. As shown in FIG. 5D, the robot 510 may have a tool holder 599 that may have three physical tools (591, 592, 593). The robot may operate each physical tool concurrently or simultaneously. The robot may only operate a subset of physical tools attached (e.g., if the robot has three physical tools, the robot may operate a single physical tool or two physical tools). As shown in FIG. 5D, the robot 510 may have a magnetic gripper 595 that may be used to pick up a 3D printed object 594. The robotic system may comprise at least about 1, 2, 3, 4, 5, 6, 7, 8, 9, 10 or more physical tools. The robotic system may comprise at most about 10, 9, 8, 7, 6, 5, 4, 3, 2, or less physical tools. The robotic system may comprise from about 1 to 10 physical tools, 1 to 5 physical tools, 1 to 2 physical tools, 3 to 10 physical tools, 3 to 5 physical tools, or 5 to 10 physical tools.

The robotic system may comprise at least about 1, 2, 3, 4, 5, 6, 7, 8, 9, 10 or more tool holders. The robotic system may comprise at most about 10, 9, 8, 7, 6, 5, 4, 3, 2, or less tool holders. The robotic system may comprise from about 1 to 10 tool holders, 1 to 5 tool holders, 1 to 2 physical tools, 3 to 10 tool holders, 3 to 5 tool holders, or 5 to 10 tool holders. In some embodiments, the tool holder may be considered a physical tool.

The robotic system may include an automatic physical tool changer. The automatic tool changer may be used to change the current tool that the robot may be using. An automatic physical tool changer may be programed to automatically change out the physical tool based on the parameters set and/or the specifications of the desired printed object. The automatic physical tool changer may be capable of holding at least 1, 2, 3, 4, 5, 10, or more physical tools.

The automatic physical tool changer may be capable of swapping out at least 1, 2, 3, 4, 5, 10, or more tools at a time. For example, the automatic physical tool changer may change out a hammer and a drill for two other tools. The automatic physical tool holder may change out a single hammer for a drill. The automatic tool physical holder may change out a single physical tool for one or more physical tools. The automatic physical tool holder may change out one or more physical tools for one or more physical tools.

The physical tool may be selected from the group consisting of a brush, gas blower, hammer, blade, spoon, metal file, fish scaler, saw, scissors, wire scraper, drill, pliers, heat gun, screwdriver, wire stripper, paper towels, welding gun, spot welder, spray gun, deburring device, grinding device, gripper, and paint spray gun. The physical tool may, for example, a brush, gas blower, hammer, blade, spoon, metal file, fish scaler, saw, scissors, wire scraper, drill, pliers, heat gun, screwdriver, wire stripper, paper towels, welding gun, spot welder, spray gun, deburring device, grinding device, gripper, and/or paint spray gun. The robot may use the one or more physical tools simultaneously or concurrently.

Figure 6A:
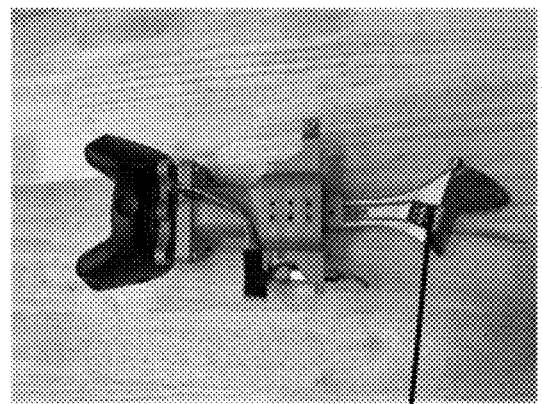
FIGS. 6A, 6B, 6C, and 6D, illustrate examples of physical tools can be operated by a user to train the robot, in accordance with some embodiments of the present disclosure.
Figure 6A:
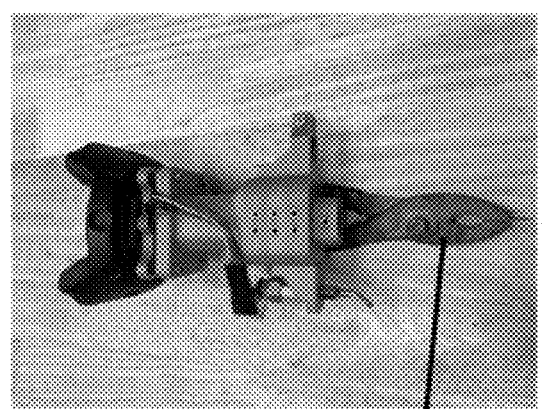
Figure 6A:
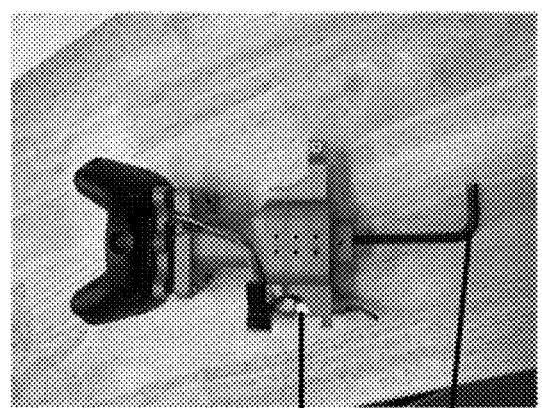
Figure 6B:
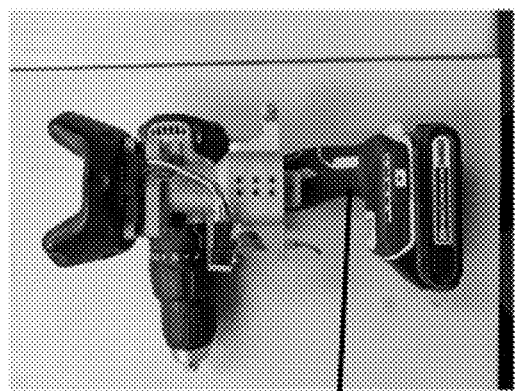
Figure 6B:
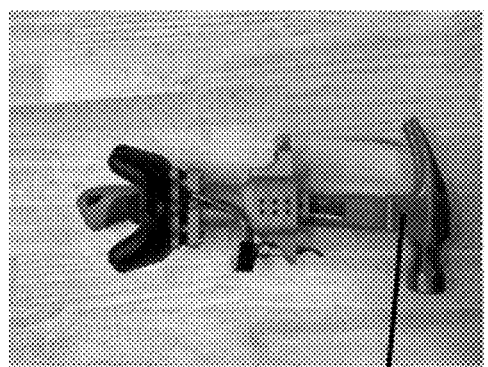
Figure 6B:
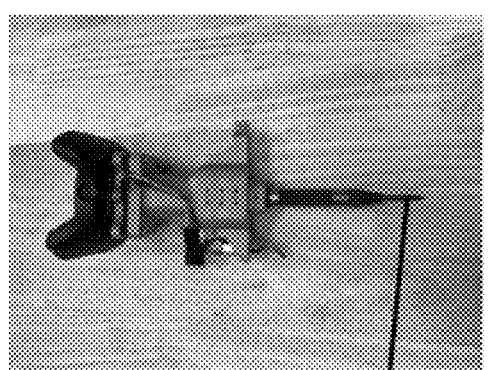
Figure 6C:
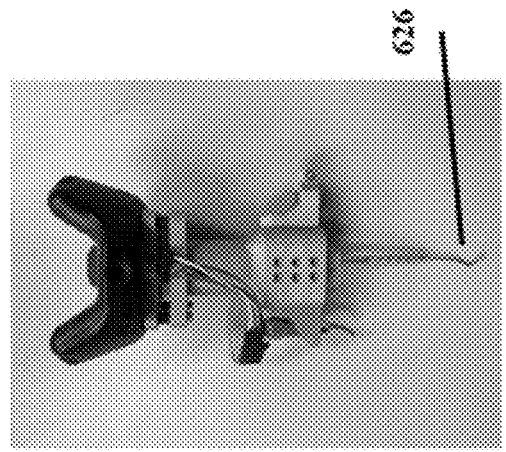
Figure 6C:
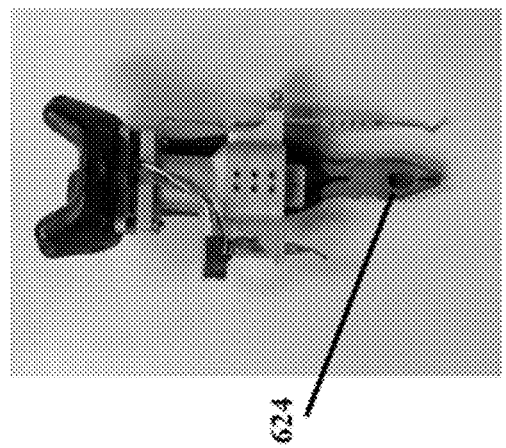
Figure 6C:
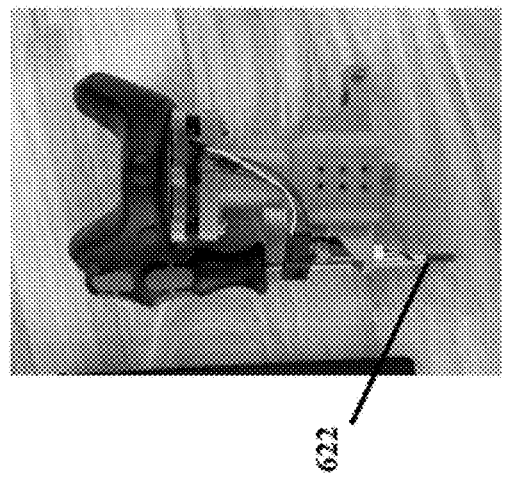
Figure 6D:
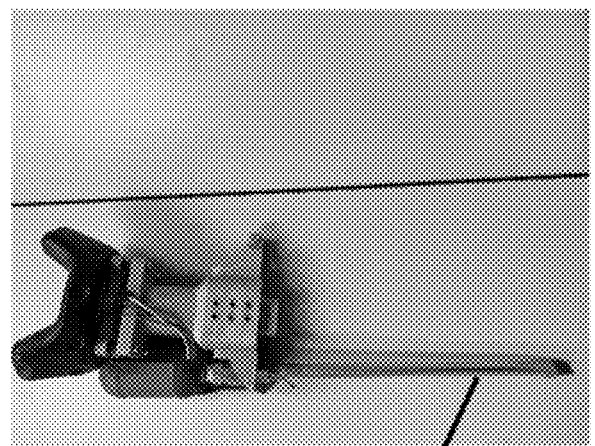
Figure 6D:
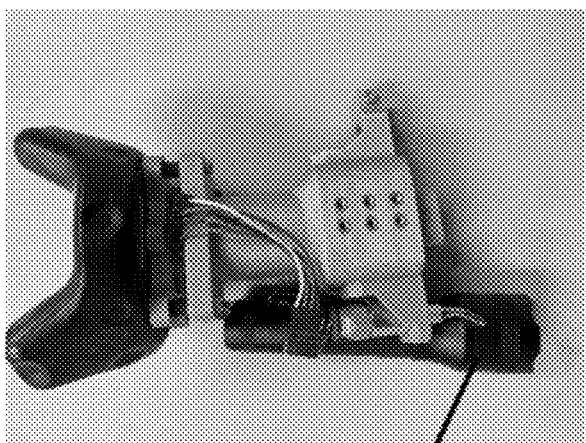

The motion tracker may be attached to a tool holder or to a physical tool. The physical tool may be any physical tool. For example, as shown in FIG. 6A, the motion tracker may be attached to a tool holder. The tool holder may be attached to an allen wrench hex key 610. The tool holder may be attached to a slip joint pliers 612. The tool holder may be attached to an adjustable wrench 614. The tool holder may be attached to an air blower 616. As shown in FIG. 6B, the motion tracker may be attached to a tool holder. The tool holder may be attached to a drill spotter orifice 616. The tool holder may be attached to a hammer 618. The tool holder may be attached to a power drill 620. As shown in FIG. 6C, the motion tracker may be attached to a tool holder. The tool holder may be attached to a utility pliers 624. The tool holder may be attached to a scalar scraper 626. As shown in FIG. 6D, the motion tracker may be attached to a tool holder. The tool holder may be attached to a flashlight 628. The tool holder may be attached to a screwdriver 630.

The gripper may be a contact gripper. The gripper may be a contactless gripper. The gripper may be used to hold a 3D printed object. The gripper may be used on to hold a physical tool. The gripper may be an impactive, ingressive, astrictive, or contigutive gripper. An impactive gripper may be jaws or claws which physically grasp by direct impact upon the object. An ingressive gripper may be pins, needles or hackles which physically penetrate the surface of the object. An astrictive gripper may be attractive forces applied to the objects surface (e.g., vacuum, magneto- or electro adhesion, etc). A contigutive gripper may be need direct contact for adhesion to take place (e.g., glue, surface tension or freezing, etc). The gripper may be an electrostatic gripper. The gripper may be a capillary gripper. The gripper may be a cryogenic gripper. The gripper may be an ultrasonic gripper. The gripper may be a vacuum gripper. The gripper may be a bernoulli gripper. The gripper may be used to pick up a 3D printed object. The gripper may be used to pick up a 3D printed object and move the 3D printed object to another location. The gripper may have a gripping force parameter. The gripping force parameter may be adjusted to reduce or increase the force on the 3D printed object. In some cases, the gripper may include sensory feedback on the jaw of the gripper to obtain more reliable grabbing of the 3D printed object. In some cases, the sensory feedback may be tactile. In some cases, the sensory feedback may be curvature. In some cases, the gripper may be a soft gripper. In some cases, the gripper may be a hard gripper. In some cases, the force of the gripper may be adjustable.

The robot may use a gripper to pick up a 3D printed object. The robot may pick up the 3D printed object from a tray containing one or more 3D printed objects. The robot may pick up the 3D printed object directly from a 3D printing system. The robot may move the picked-up 3D printed object into a chamber. The chamber may be used to remove powder material from the 3D printed object. The robot may remove the 3D printed object from the chamber. The robot may place the 3D printed object into an abrasive media. The robot may move the 3D printed object in any motion within the abrasive media. The robot may use trained movement to manipulate the 3D printed object within the abrasive media. The robot may remove the 3D printed object from the abrasive media. The robot may place the 3D printed object into the chamber to remove any abrasive media and/or loose powder material. The robot may place the 3D printed object onto a tray afterwards.

The chamber may be any shape or size. The chamber may be capable of holding one or more 3D printed objects. The chamber may be attached to one or more vacuum systems. The chamber may be attached to one or more air sources that may supply air pressure into the chamber. The vacuum and/or air sources may be used to removed loose powder material from the 3D printed object. The chamber may include any number of orifices in order to allow vacuum and/or air sources into the chamber. In some cases, a neutral gas (e.g., argon, nitrogen, hydrogen, etc) may be used to remove loose powder material from the 3D printed object. In some cases, the robot may move the 3D printed object in front of one or more air sources without the need of a chamber for de-powdering of the 3D printed object. The chamber may be rectangular and may include an orifice for the entry of the robot and/or a tool.

The 3D printed object may be stationary relative to the abrasive media. In some cases, the abrasive media may be stationary relative to the 3D printed object. In some cases, the abrasive media may be fluidized. The abrasive media may be, for example, sand, silicon dioxide, aluminum dioxide, silicon carbide, glass beads, walnut shell grit, corn cob grit, steel shot, pumice grit, urea (type II) plastic abrasive grit, melamine (type III) plastic abrasive grit, acrylic (type IV) plastic abrasive grit, garnet grit, kramblast crushed glass grit, steel grit, etc. The abrasive media may be used for de-powdering (e.g., removing loose powder material), deflashing, removing machine marks, sanding, edge rounding, surface preparation, cleaning, scale and/or rust removal, surface finish medication, coating preparation, abrasion resistance in coating, create specific surface finishes, etc. In some cases, the abrasive media may be vibrated.

The physical tool may be selected depending on the present 3D printed object. The physical tool may be selected depending on the 3D printed object in queue. The physical tool may be selected depending on a particular operation that may be needed to perform on a 3D printed object. For example, a 3D printed object may be needed to be dislodged from a 3D printed build and then have any loose residual powder removed. The robot may first use a hammer to dislodge the 3D printed object (e.g., 3D printed part or green part) and then use an air blower to blow away loose residual powder from the 3D printed object.

The physical tool used by the robot may be of any mass. The physical tool may be of equal, smaller mass, or larger mass, than the mass of the physical tool used by a user. For example, the physical tool (e.g., a hammer) used by a user may weigh three kilograms (kg) while the physical tool used by the robot may weigh ten kgs. In another example, the physical tool (e.g., a hammer) used by a user may weigh three kgs while the physical tool used by the robot may weigh three kgs. In another example, the physical tool (e.g., a hammer) used by a user may weigh three kgs while the physical tool used by the robot may weigh one kg. The robot may use one or more physical tools with the same or different masses (e.g., one physical tool with the same mass and one physical tool with a larger mass).

The physical tool used by the robot may be of any size. The physical tool may be of equal size, smaller size, or larger size, than the size of the physical tool used by a user. For example, the physical tool (e.g., a hammer) used by a user may be 0.1 meters in length, the physical tool used by the robot may be 0.5 meters in length. In another example, the physical tool (e.g., a hammer) used by a user may be 0.1 meters in length, the physical tool used by the robot may be 0.05 meters in length. In another example, the physical tool (e.g., a hammer) used by a user may be 0.1 meters in length, the physical tool used by the robot may be 0.1 meters in length.

In some embodiments, the physical tool may have control markers that may allow for more accurate location tracking. The control markers may be passive markers (e.g., colored points) or active markers which may generate their own signal (e.g., light emitting diodes).

IV. Motion Data and User Movement

Figure 4A:
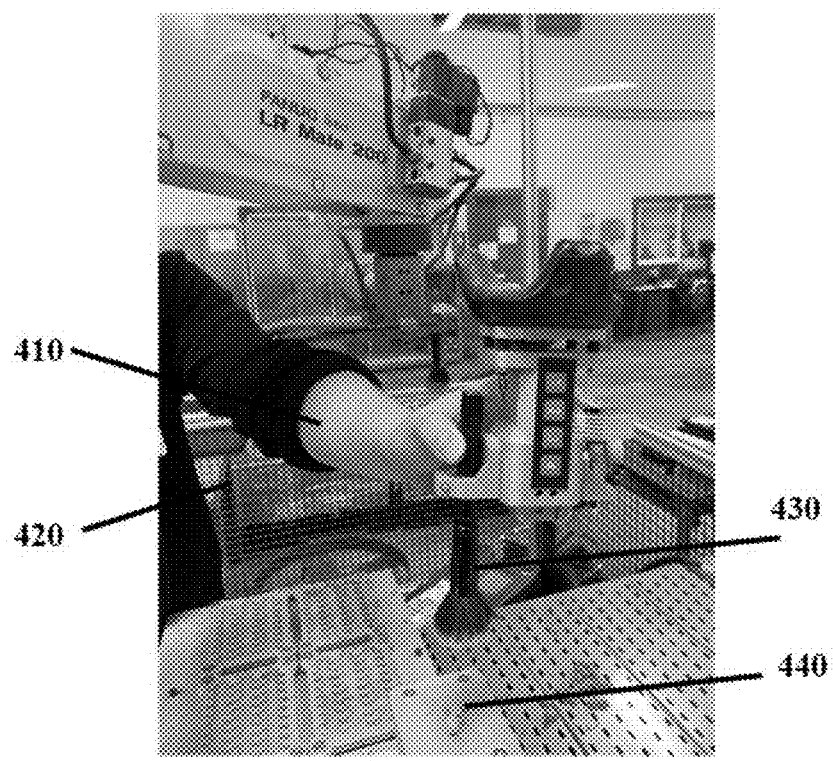
FIG. 4A illustrates a user holding a physical tool with a motion tracker, in accordance with some embodiments of the present disclosure.

The method may include using the sensor of the robotic system to capture movement from a user operating the physical tool. The user may operate the physical tool within the general area generated by the base station. As shown in FIG. 4A, the user 410 may hold a tool holder 430 that has a motion tracker 420 attached. The user may hold the tool holder and operate the physical tool 490 (e.g., brush) from holding at the tool holder. In some cases, the motion tracker may be attached to the physical tool directly. In some cases, the user may hold the motion tracker attached to the physical tool and operate the physical tool from this contact point.

The user may operate the physical tool on an object. The object may be, for example, a two-dimensional object or a three-dimensional object. The object may be generated using a three-dimensional (3D) printing process. The object may be a final product or a green part object (intermediate object). The object may be of any dimension and/or shape.

The user may operate the physical tool with a sensor. The motion data (e.g., coordinates, velocities, accelerations, etc) of the physical tool may be transmitted to the VR environment. The motion data may be transmitted by the sensor. In some cases, the motion data may be recorded by the sensor and uploaded to a computer system. In some cases, all the motion data of physical tool movement may be captured. In some cases, segments of motion data of the physical tool movement may be captured. In some cases, segments of motion data may be pieced together to form longer sets of movement.

In some embodiments, motion data captured from using one or more tools may be pieced together to form longer sets of movement. For example, a user may first use a physical tool (e.g., a hammer) to dislodge a green part from a 3D printed build. The user may then use a physical tool (e.g., an air blower) to remove any loose residual powder from the green part. The motion data from using the hammer and the motion data from using the air blower may be captured using one or more sensors. The motion data may then be combined such that when provided to the robotic system, the robotic system operates the hammer and then the air blower. The motion data may be pieced together in any fashion. For example, the use of the air blower by the robotic system may come before the use of the hammer by the robotic system despite the user using the hammer first and then the air blower. The motion data may also be pieced together such that there may be a pause in between actions. For example, the robotic system may use the hammer, pause for three seconds, and then use the air blower.

Figure 4B:
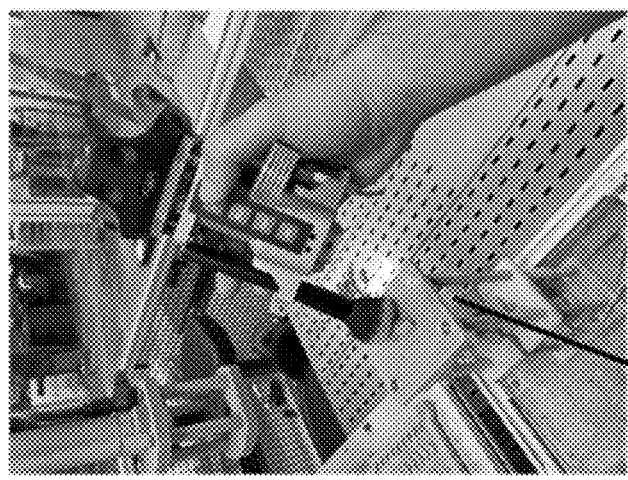
FIG. 4B and FIG. 4C illustrates a user operating a physical tool, in accordance with some embodiments of the present disclosure.
Figure 4B:
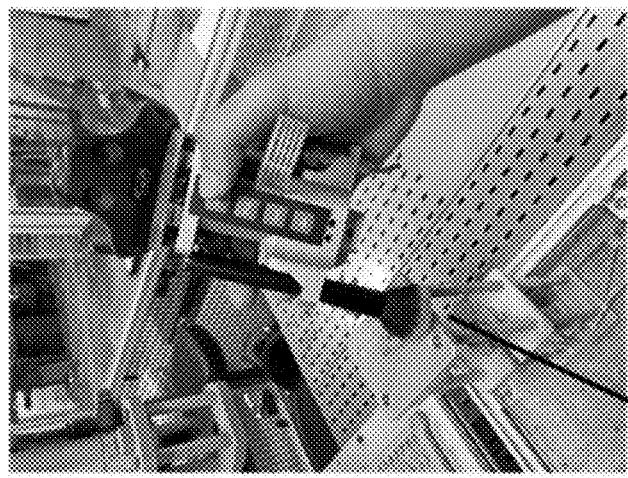
Figure 4B:
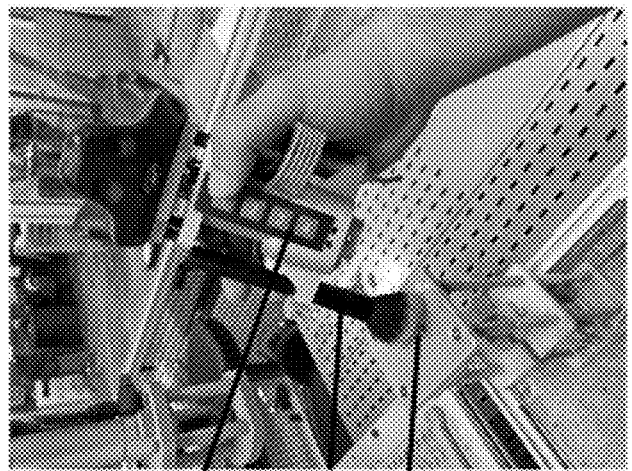

In FIG. 4B, the user operates the physical tool 490 on the 3D printed object 440. The user may use a brush to clean off loose powder material from the 3D printed object (e.g., de-powdering the 3D-object) by sweeping the brush in contact with the 3D printed object left 450 and then right 460. The motion tracker attached to the brush may track the movement of the user during the cleaning process of the 3D printed object and may provide the motion data. The user may move the physical tool in any direction in a three-dimensional plane. The 3D printed object may remain stationary in comparison to the physical tool and/or user. The 3D printed object may change locations relative to the physical tool and/or user.

Figure 4C:
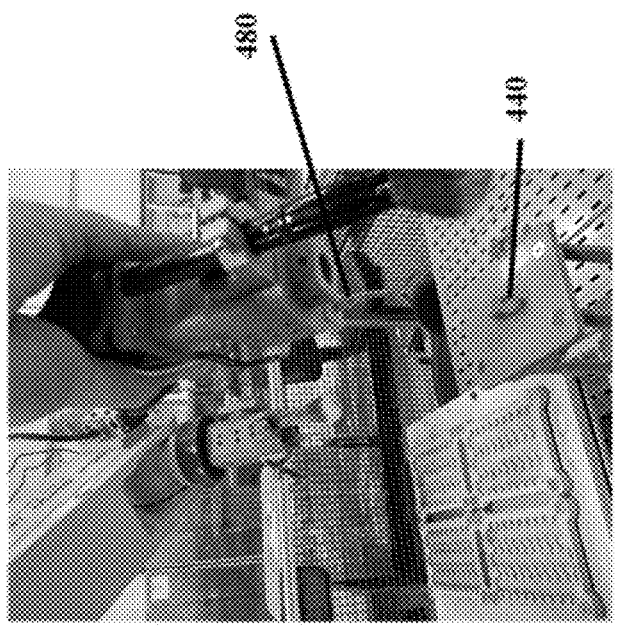
Figure 4C:
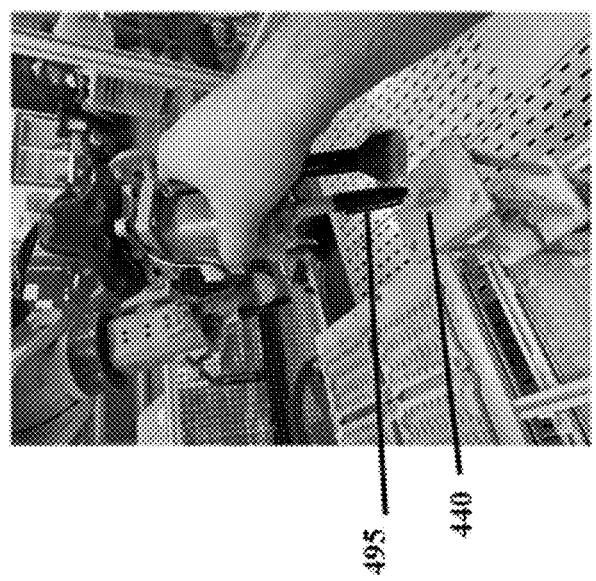

The user may use a variety of different tools as described elsewhere herein. As shown in FIG. 4C, the user operates an air blower 480 to remove loose powder material from the 3D printed object 440. The motion tracker may be attached to the tool holder that may be attached to the air blower 480. The motion tracker may collect motion data as the user may operate the air blower 480 on to the 3D printed object 440. As shown in FIG. 4C, the user may operate a pen 495 on a 3D printed object. The motion tracker may collect motion data as the user may operate the pen 495 on to the 3D printed object 440.

The user may operate a physical tool on an object (e.g., 3D printed object) to polish, sand, abrade, buff, tumble, machine, coat, heat, and/or air blow the object. The user may operate one or more physical tools on one or more 3D printed objects. For example, the user may use a hammer and a drill on a 3D printed object. In another example, the user may use a hammer on ten 3D printed objects. In another example, the user may use a hammer and a drill on 100 3D printed objects.

In some embodiments, the motion data may be altered. In some embodiments, a scaling factor may be applied to the motion data. For example, the user may operate a brush to clean a 3D printed object in 10 seconds. The motion data collected may be altered such that when the robot cleans a 3D printed object, the robot cleans the 3D printed object in 1 second. The scaling factor may be at least about 0.1, 0.5, 1.0, 1.1, 1.2, 1.3, 1.4, 1.5, 1.6, 1.7, 1.8, 1.9, 2.0, 5.0, 10.0, 100.0, or more. The scaling factor may be at most about 100.0, 10.0, 5.0, 2.0, 1.9, 1.8, 1.7, 1.6, 1.5, 1.4, 1.3, 1.2, 1.1, 1, 0.5, 0.1 or less. The scaling factor may be from about 0.1 to 100.0, 0.1 to 10.0, 0.1 to 5.0, 0.1 to 2.0, 0.1 to 1.0, 0.1 to 0.5, 1.0 to 100.0, 1.0 to 10.0, or 1.0 to 1.5.

IV. Robot Training

The use of virtual reality training for robotic training/programming as described herein may provide a variety of benefits. In some cases, the variety of benefits may be in comparison to traditional methods of robot training/programming. The benefits may be, for example, faster robotic training, faster robot repurposing, greater quantity of robot(s) trained, greater quantity of robot(s) trained in a given time, greater quantity of robot(s) trained per training event (e.g., single acquisition of user motion data to train any number of robots), less robot downtown due to training/programming, etc.

Figure 8:
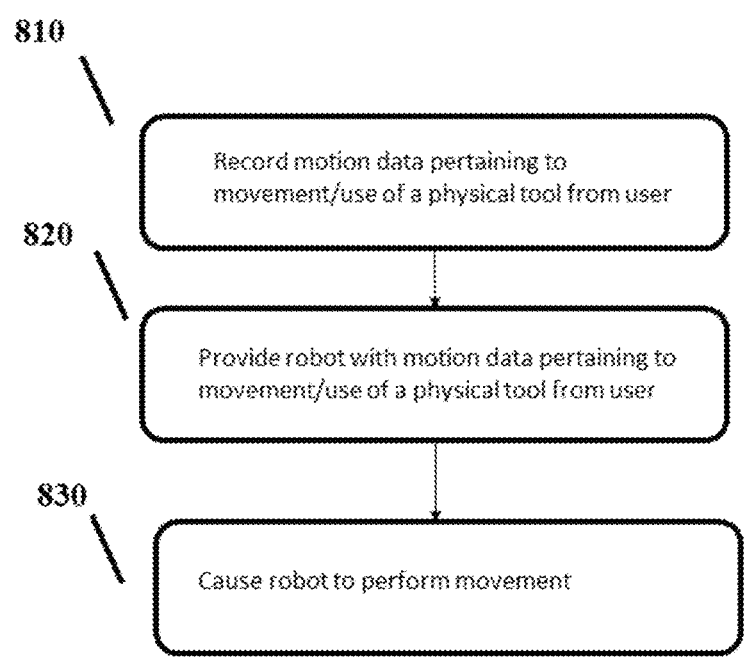
FIG. 8 illustrates a flow diagram for providing motion data to the robot, in accordance with some embodiments of the present disclosure.

The method may further include using at least the movement (e.g., motion data) captured by the sensor to train the robot. The robot may be trainable. The robot may be programmable. The robot may be as described elsewhere herein. As shown in FIG. 8, the motion data pertaining to movement of the physical tool by the user may be recorded (operation 810). The motion data pertaining to the movement of the physical tool by the user may then be provided to the robot (operation 820) to train the robot. The method may include such that upon training, the robot may be able to perform at least the movement (operation 830). In some embodiments, the motion data may be prerecorded or obtained from a database of motion data.

The motion data can be used to generate computer instructions that, when executed by a controller coupled to or integrated into the robot, cause the controller to control the robot such that the robot performs the motion defined by the motion data. Specifically, the controller can output signals that cause motors and actuators within the robot to perform the motion. The motions may be as described elsewhere herein. In some cases, the controller can learn (i.e., be trained) to output the signals that cause the robot to perform the motion through trial-and-error. For example, the controller can be trained using a reinforcement learning process.

In reinforcement learning, a software agent can choose an action from a set of available actions (e.g., a particular controller output from a set of possible outputs). The action may result in a new environmental state (e.g., a new robot position). The new environmental state may have a reward associated with it, and the reward may be positive or negative depending on whether the new state is better or worse than the previous state (e.g., whether the new robot position is correct). The goal of the agent may be to collect as much reward as possible. The set of available actions from which the agent can choose may be a probability distribution of actions. The probability distribution may be adjusted as the agent receives rewards. That is, actions that result in negative rewards may be slowly filtered out of the probability distribution, while actions that result in positive rewards may be emphasized in the probability distribution. Reinforcement learning may be used to generate more clean 3D printed objects.

The robot may be used to replicate the motion by the user. The robot may use the motion data generated by the user. As shown in FIG. 4B, the user operates a physical tool to clean a 3D printed object. The movement captured by the sensor can be used by the robot to operate a physical tool to clean a 3D printed object. As shown in FIG. 5A, the robot 510 may hold the physical tool 520 to clean a 3D printed object 530. In some cases, the robot may hold a tool holder that may hold a physical tool. In some cases, the tool holder may be attached to the robot. In some cases, the robot may hold a physical tool. In some cases, the physical tool may be attached to the physical robot.

Like in FIG. 4B, where the user may operate the physical tool to brush left 450 and then brush right 460 on the 3D printed object, the robot may perform the same movement of brushing left 540 and then brushing right 550 on the 3D printed object. The 3D printed object may be placed onto a table 560. The robot may perform any movement provided by the motion data from the user. The robot may repeat the motion by the user many times (e.g., a robot trained to use a cleaning brush with the deft of a user may be used to repeat the process one or more times in manufacturing). For example, a user may operate (e.g., clean) a physical tool (e.g., brush) with a motion sensor on a 3D printed object. The motion data may be transferred to the robot to operate the physical tool on a 3D printed object (e.g., clean the 3D printed object with a brush). The robot may continue to use the motion data to operate on one or more 3D printed object (e.g., clean one or more 3D printed objects with a brush). The one or more 3D printed objects may be in different locations with respect to one another or to the robot. The robot may move to each individual 3D printed object and perform the movement provided by the motion data from the user (e.g., the robot may move to each individual 3D printed object and begin cleaning of each 3D printed object, consecutively). The one or more 3D printed objects may be organized on a coordinate grid of any dimension. The robot may perform the movement provided by the motion data from the user to any object within the coordinate grid in any particular order. For example, the robot may be trained to clean one 3D printed object in the coordinate grid. The robot training may be translated such that the robot may continue to clean any number of 3D printed objects within the coordinate grid.

The robot may perform more complex movement in 3D dimensional space. As shown in FIG. 5B, the robot may begin brushing 580 a 3D printed object 595. The robot may then circle around 585 the 3D printed object and may begin brushing the 3D printed object once again 590. The robot may brush the 3D printed object from any angle. The robot may perform complex movement with any number of tools. The robot may swap out tools and may use one or more tools.

The robot may perform movement in real time. For example, the user may use a tool and the robot may perform the same movement with minimal delay.

In some embodiments, the robot may operate a physical tool on one or more 3D printed object. The robot may then pick up and move the one or more 3D printed objects. The robot may continue to operate the physical tool on the one or more 3D printed object. For example, the robot may clean a 3D printed object and then flip over the 3D printed object and continue to clean the 3D printed object. The robot may perform such action using motion data provided from a user where the user cleans a 3D printed object, flips the 3D printed object and continues to clean the 3D printed object. In some embodiments, cleaning may refer to de-powdering of the 3D printed object. In some cases, de-powdering of the 3D printed object may refer to removing excess powder from the 3D printed object. In some cases, de-powdering of the 3D printed object may refer to removing labile powder from the 3D printed object.

In some embodiments, the robot may be trained to operate one or more physical tools onto a single 3D printed object. The robot may use the training for operating one or more physical tools on a single 3D printed object to operate one or more physical tools on one or more other 3D printed objects. The robot may use the training for operating one or more physical tools on a single 3D printed object to operate one or more physical tools on one or more different 3D printed objects.

The user motion data may be used to program/train any number of robots. The user motion data may be used to program/train at least about 1, 2, 3, 4, 5, 6, 7, 8, 9, 10, 11, 12, 15, 30, 50, 100, 1000, 10000, 100000, or more robots. The user motion data may be used to program/train at most about 100000, 10000, 1000, 100, 50, 30, 15, 12, 11, 10, 9, 8, 7, 6, 5, 4, 3, 2, or less robots. The user motion data may be used to program/train from about 1 to 100000 robots, 1 to 10000 robots, 1 to 1000 robots, 1 to 100 robots, or 1 to 10 robots.

The user motion data may be used to instantly program/train any number of robots. For example, the acquired motion data may be used to train/program a robot instantly after acquisition.

In some embodiments, the robot may be provided the motion data using the software of the robot. In some cases, the motion data may be provided to the robot using custom software.

In some embodiments, the robot may be provided a computer model of a 3D printed object. The computer model of the 3D printed object may include slices (e.g., cross sections) of the 3D printed object. The sliced 3D printed object may be used to distinguish a particular cross-section of the 3D printed object. The robot may use the computer model of the 3D printed object to create G-code for training the robot or to supplement the VR training of the robot. The robot may be trained to use tools for milling of the one or more 3D printed objects. The robot may use the 3D printed object model to generate more accurate 3D printed objects. The robot may compare the 3D printed object to the specifications of the 3D printed model object to determine whether the robot needs to perform one or more operations on the 3D printed object. The robot may generate a toolpath using the 3D printed computer model. The robot may use an image processing system as described elsewhere herein.

The robot may use one or more tools to generate an object to hold said one or more 3D printed objects. The robot may use the 3D printed model object to generate an object that accurately matches the dimensions and geometric shape of the 3D printed object.

V. Robot handling of 3D printed objects

The use of a robotic system to perform action(s) on one or more 3D printed objects may provide a variety of benefit(s). In some cases, the variety of benefits may be in comparison to a human user who may perform action(s) on one or more 3D printed objects. The benefits may be, for example, greater reproducibility, greater traceability, greater accuracy, more diverse tool handling (e.g., a robot may handle more tools than a human user, a robot may change tools faster than a human user, a robot may handle tools purposely quicker or slower than a user, etc.), less downtime, less error, faster part handling, faster part production, etc. The robot may also save time for a human user by allowing the robot to conduct repetitive tasks instead of a human user. The robot may minimize human effort in certain tasks. In some cases, a symbolic relationship may be generated by a human user and robot. The symbolic relationship may allow for the user to save time, minimize human effort, and/or allow the human user to direct attention to particular tasks.

The robotic system may perform a variety of one or more actions (e.g., operating one or more physical tools, changing out one or more physical tools, selecting one or more physical tools, removing 3D printed parts from a layer of bound powder material, locating 3D printed objects, breaking/removing 3D printed objects from a support structure, picking up and moving 3D printed objects, cleaning 3D printed objects, de-powdering 3D printed objects, washing 3D printed objects, setting 3D printed objects onto setters/custom setters, loading 3D printed objects into a furnace, removing 3D printed objects from a furnace, manipulating 3D printed objects using one or more physical tools, providing 3D printed objects to quality control, machining 3D-printed parts, etc). As shown in FIG. 5C, the robot may locate 570 a 3D printed object on a part tray 591. The location of the 3D printed object may be pre-programmed such that the robot may have the location of each 3D printed object in memory. The location of the 3D printed object may be known through the training from user motion data. The robot may locate the 3D printed object and pick up the 3D printed object 571. The robot may operate a physical tool (e.g., magnetic actuator/gripper) to pick up the 3D printed part. The robot may move the 3D printed object into the proximity of an air blower 572 to have the air blower 573 remove loose powder material from the 3D printed object. The robot may then move the 3D printed object to an elevated table 579. The robot may move the 3D printed object without performing any action in between. The robot may operate a physical tool 581 (e.g., a brush) to remove loose powder material (e.g., de-powdering). The robot may use motion data provided by a user operating a physical tool (e.g., brush) to operate the brush on the 3D printed object. The robot may operate one or more physical tools on the 3D printed object as described elsewhere herein. The robot may for example, operate 576 an air blower 582 that may be attached to the tool holder or robot on the 3D printed object. The robot may use motion data provided by a user operating a physical tool (e.g., air blower) to operate the air blower on the 3D printed object. After the robot has completed cleaning the 3D printed object, the robot may pick up 577 the clean 3D printed object and move 578 the 3D printed object to a tray 592. The tray may be a different tray from which the robot may pick up a 3D printed object. The tray may be the same tray from which the robot may pick up a 3D printed object. The tray may have one or more 3D printed objects. The robot may continue to operate a physical tool on the one or more remaining objects. The robot may operate a physical tool on each 3D printed object prior to moving any of the 3D printed objects to a different tray. The robot may operate a physical tool on each 3D printed object before operating a different physical tool. The robot may operate one or more different physical tool on each 3D printed object before moving on to the next 3D printed object.

Figure 5E:
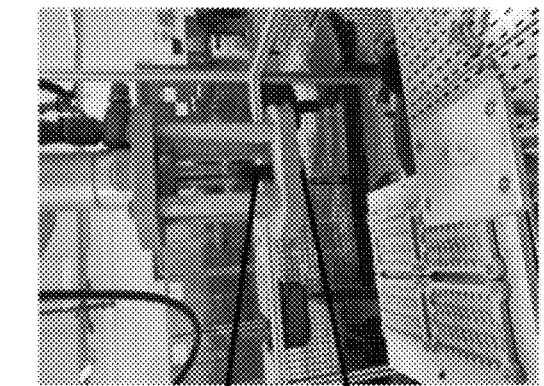
FIG. 5E illustrates a robot using a magnetic actuator to pick up a 3D printed object, in accordance with some embodiments of the present disclosure.
Figure 5E:
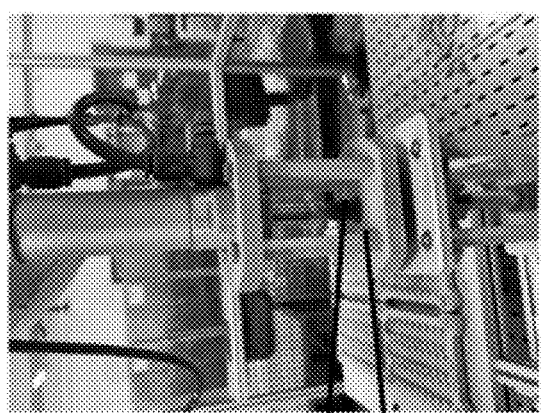
Figure 5E:
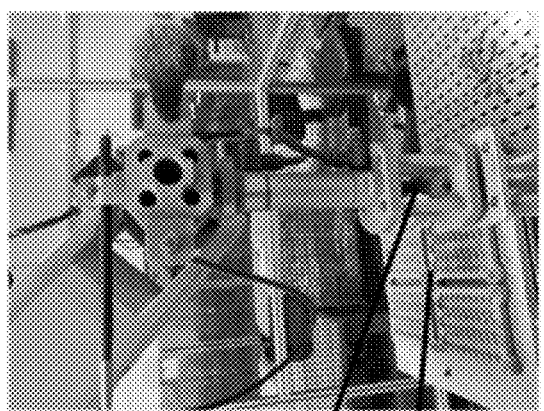

The robotic system may use a magnetic actuator 531 to pick up one or more 3D printed objects. As shown in FIG. 5E, the magnetic actuator may be in a retracted position 535 prior to picking up a 3D printed object. The magnet actuator may then be utilized 532 to contact a 3D printed object. The 3D printed object 534 may be lifted up due to a magnetic force. In some cases, the magnetic actuator may magnetize the 3D printed object. In some cases, the 3D printed object may be demagnetized after being magnetized.

In some embodiments, the robot may handle powder material. In some embodiments, the robot may handle a layer of bound powder material. The layer of bound powder material may come from a 3D printing system or process. The robot may handle the layer of bound powder material using one or more physical tools (e.g., a gripper). The robot may be provided the layer of bound powder material by a user. The robot may remove the one or more 3D printed objects from the layer of bound powder material. The robot may remove the one or more 3D printed objects from the layer of bound powder material at any speed. The robot may remove the one or more 3D printed objects from the layer of bound powder material in a way to minimize deformation of the one or more 3D printed objects. The robot may remove one or more 3D printed objects from the layer of bound powder material using one or more physical tools.

In some embodiments, the removed one or more 3D printed objects may be placed onto a tray by the robot. The removed one or more 3D printed objects may be placed onto a setter/custom setter by the robot. The robot may place the one or more 3D printed objects onto a tray and/or setter/custom setter at any speed.

In some embodiments, the robot may place the one or more 3D printed objects into container (e.g., a Molybdenum or ceramic box). The robot may assemble the molybdenum or ceramic box. The robot may place the box into a furnace. The robot may place the one or more 3D printed objects into the furnace. The robot may operate the furnace (e.g., turn on the furnace, adjust the temperature of the furnace, etc). The robot may remove the box from the furnace. The robot may remove the one or more 3D printed objects from the furnace. The robot may operate one or more tools to remove the one or more 3D printed objects from the furnace. The robot may place the one or more printed objects onto a tray. The robot may place the one or more printed objects onto a conveyor belt.

In some embodiments, the robot may operate one or more physical tools on the one or more 3D printed objects as described elsewhere herein. In some cases, the 3D printed objects may be from a furnace. In some cases, the 3D printed objects may be from a user. In some cases, the 3D printed objects may be from a 3D printing system or process. The robot may prepare the one or more 3D printed objects for quality control.

In some embodiments, the robot may perform quality control. Quality control may be, for example, where a 3D printed object may be maintained or improved upon. Quality control may include testing one or more 3D printed objects to see if the one or more 3D printed objects are within the desired specifications. The robot may be provided one or more parameters regarding the one or more 3D printed objects. The robot may continue to operate one or more tools on the one or more 3D printed objects if the one or more 3D printed objects do not have the desired parameters/specifications. The desired parameters may be determined using a predetermined threshold value provided by a user.

In some embodiments, the robot may prepare the one or more 3D printed objects for quality control for a user. The robot may prepare the one or more 3D printed objects for quality control by organizing the one or more 3D printed objects. The 3D printed objects may be organized by the robot according to, for example, size, shape, weight, cleanliness, quantity, quality as determined by a threshold value, etc. The robot may organize the 3D printed objects as predetermined by a user. The robot may organize the one or more 3D printed object at any speed.

VI. Image Processing

Figure 13:
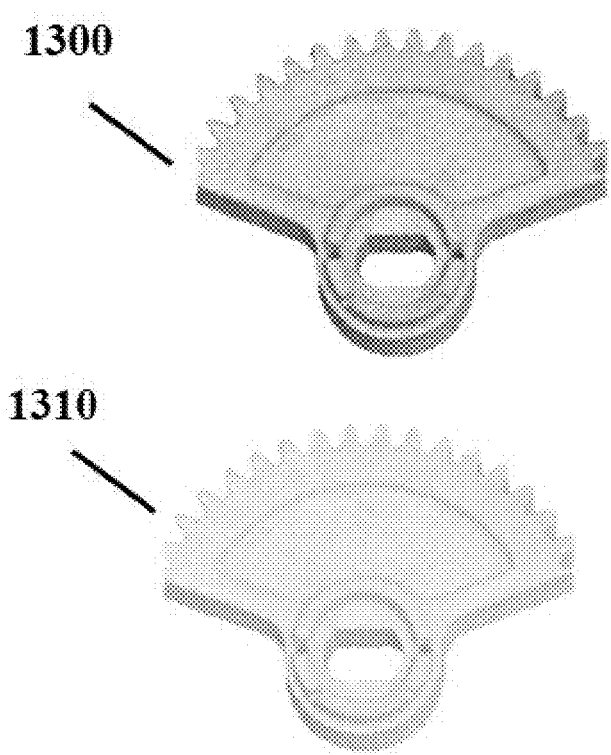
FIG. 13 shows a cap region generated from a 3D printed part, in accordance with some embodiments of the present disclosure.

The robotic system may also include an image processing system. The image processing system may be used to recognize one or more 3D printed objects. The image processing system may be used for selection of a 3D printed object for manipulation (e.g., removing loose powder material) by the robot. For example, the image processing system may be used to select a 3D printed object from a tray of one or more 3D printed objects. The robot may then pick up the 3D printed object selected by the image processing system. The image processing system may also be used to eliminate 3D printed objects from being selected by the robot for de-powdering. The robot may use the image processing system to aid in determining whether to end manipulation of the 3D printed object. For example, the image processing system may be used to determine whether the robot has finished cleaning the one or more 3D printed objects. The image processing system may allow for the robot to process more The image processing system may include one or more cameras. The one or more cameras may be attached to the robotic arm. The one or more cameras may be external from the robot. The one or more cameras may be, for example, digital cameras. The digital cameras may record digital images and/or video. The images may be processed through an algorithm in real time or after a given time period. The image processing system may generate a cap region of a 3D printed part. The cap region may be generated from the computational geometry of the 3D printed object. The cap region may be generated from the cross-sections of the 3D printed object in computer memory. The cap region may be used by the image processing system to assist the robot in locating and/or orientating parts. The cap region may be used to aid the robot in selecting which 3D printed object to act upon using one or more tools. For example, as shown in FIG. 13, the image processing system may generate a cap region 1310 of the 3D printed object 1300. The 3D printed object 1300 may exist in computer memory as a 3D model and/or in real space as a physical 3D printed object. The cap region may be substantially similar to the 3D printed object. In some cases, the cap region generated may have a similar shape and size to the 3D printed object. The cap region may be an outline of at least a portion of the 3D printed object.

Figure 14:
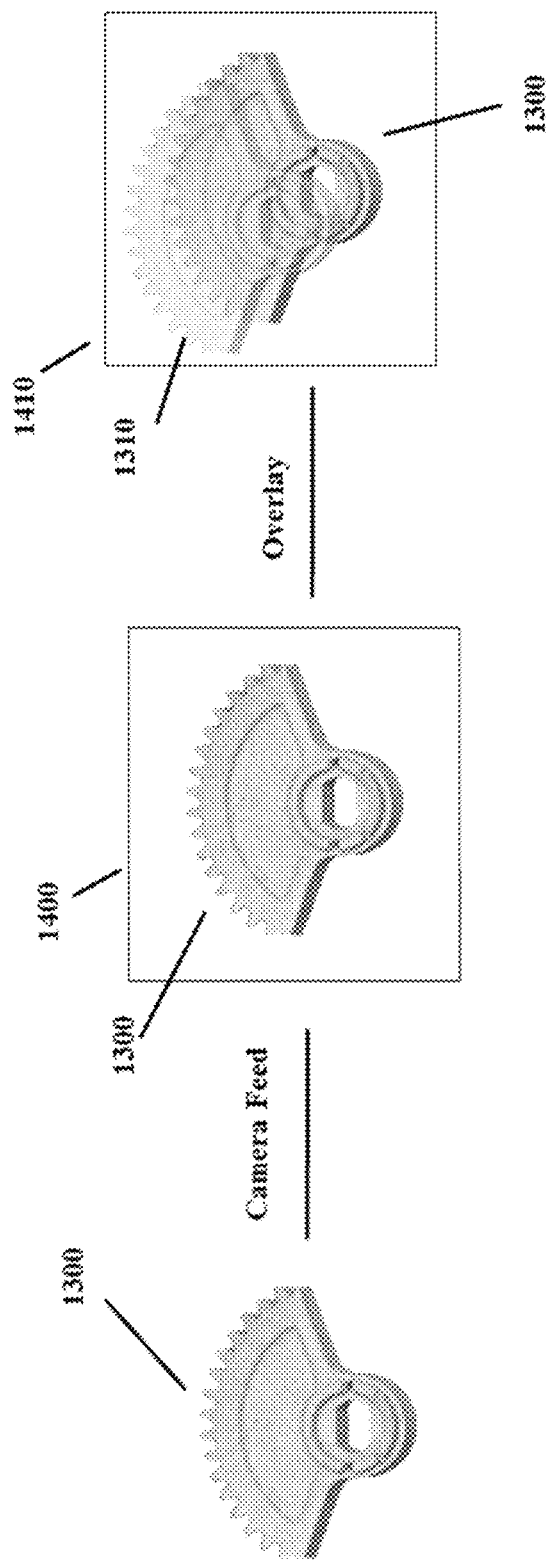
FIG. 14 illustrates the image processing flow, in accordance with some embodiments of the present disclosure.

As shown in FIG. 14, the image processing system may generate an image 1400 of the 3D printed object. The image processing system may use the generated cap region 1310 to overlay on top of the image and/or video capture 1410 to find the 3D printed object. In some cases, when the generated cap matches the 3D printed object, the 3D printed object may be orientated and/or acted on using one or more tools as described elsewhere herein.

The image processing system may use a machine learning algorithm and/or deep learning algorithm to aid in image processing for selecting 3D objects. The deep learning algorithm may include one or more convolutional neural networks. The image processing system may use one or more features of the 3D printed objects for the selection of a 3D printed object by the robot. The one or more features of the 3D printed objects may be, for example, surface finish, geometry, mass, cross-sections, etc. The one or more features may be relative to a 3D printed object model design within computer memory. The one or more features may be within a statistical variation value relative to a computer model of a 3D object and/or of a physical 3D printed object. The one or more features may be provided by a user. The one or more features may be updated by a user. The machine learning and/or deep learning methods may be trained using the features from the one or more digital images and/or video.

The robot may use the image processing system to aid post processing of the 3D printed object. For example, the image processing system may determine that a 3D printed object is outside a statistical variation. The robot may then use one or more tools to adjust the 3D printed object as described elsewhere herein. The robot may use the 3D printed model object to determine whether the 3D printed object needs further manipulation (e.g., de-powdering, cleaning, or bending the 3D printed object into conformance with specifications). The robot may adjust the 3D printed object until the 3D printed object is within a certain parameter of the 3D printed model object.

In some embodiments, the present disclosure provides a method for forming a 3D printed object. The method may comprise obtaining one or more images of a 3D printed object. The method may generate a cap region of the 3D printed object. The method may overlay the generated cap region onto the one or more images of the 3D printed object. The method may use the generated overlay to identify the 3D printed object in real space. The generated overlay may be used to orientate the robot with respect to said 3D printed object. The robot may use one or more tools on the 3D printed object. The robot may be VR trained as described elsewhere herein.

VII. Computer Systems

Figure 12:
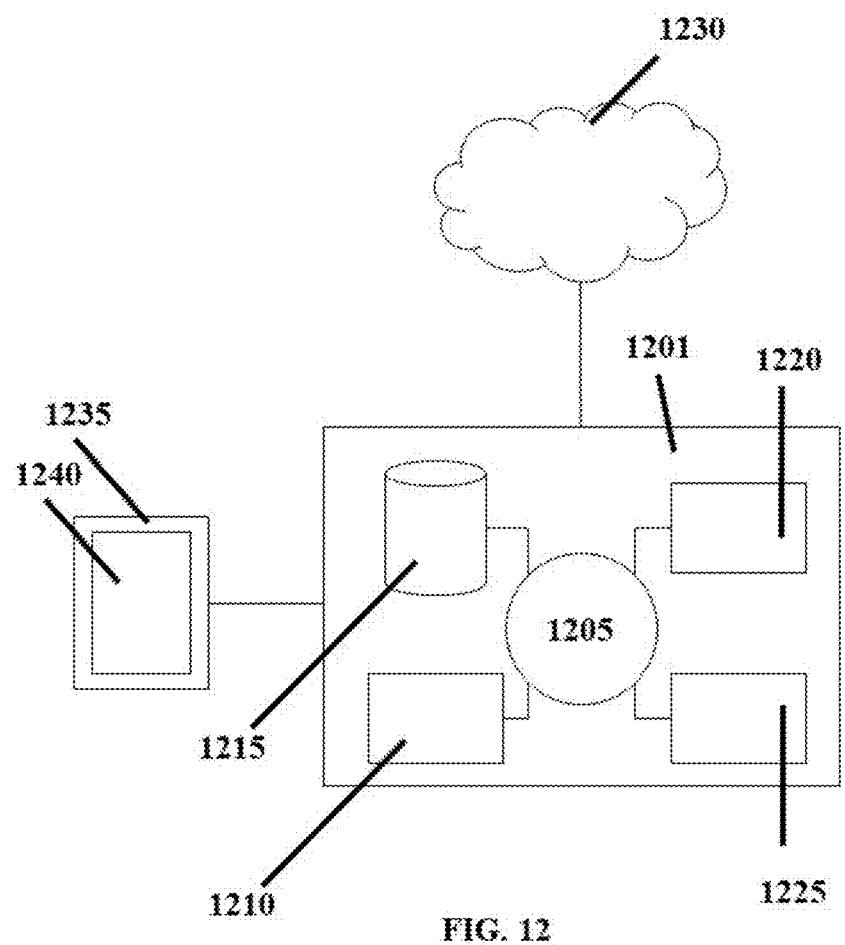
FIG. 12 shows a computer system that is programmed or otherwise configured to implement methods provided herein.

The present disclosure provides computer systems that are programmed to implement methods of the disclosure. FIG. 12 shows a computer system 1201 that is programmed or otherwise configured to control sensors of the robotic system to record motion data, provide a virtual reality environment, provide a robotic physical coordinate system, convert the record motion data to a robotic physical coordinate system, provide motion data to a robotic system, cause a robot perform the motion data collected from a user operating a physical tool, actuate motors of the robotic system, and cause a robot to perform quality control, image processing, generating a cap region, etc. The computer system 1201 can regulate various aspects of sensors, motion data, virtual reality environment, robotic physical coordinate environment, of the present disclosure, such as, for example, collecting motion data, providing motion data to the robot, etc. The computer system 1201 can be an electronic device of a user or a computer system that is remotely located with respect to the electronic device. The electronic device can be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine-readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, the virtual reality environment, the robotic physical coordinate system, etc. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, control the sensors, generate a reference frame for the virtual reality environment, or convert motion data collected in the VR coordinate system to the robotic physical coordinate system, etc.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A robotic system for handling physical tools, comprising:
   (a) a robot configured to be trainable;
   (b) a sensor attached to at least one physical tool and configured to capture motion data that records movement of a user operating said at least one physical tool; and
   (c) a virtual reality environment configured to process and provide at least said movement captured in (b) to train said robot to perform at least said movement, such that upon training of the robot, the robotic system is configured to perform operations including:
      obtaining one or more images of a 3D printed object;
      locating the 3D printed object by overlaying at least a portion of a computer model of said 3D printed object on said one or more images of said 3D printed object;
      positioning a VR trained robot based on the location of the 3D printed object, wherein the VR trained robot has been trained based on sensor data from a sensor that captures movement from a user operating at least one physical tool to process one or more 3D printed objects corresponding to the computer model; and
      using the VR trained robot to use one or more tools on said 3D printed object by repeating the movement of the user.

2. The robotic system of claim 1, wherein said sensor comprises a motion tracker.

3. The robotic system of claim 2, wherein said motion tracker captures said movement of the user.

4. The robotic system of claim 3, further comprising a base station.

5. The robotic system of claim 4, wherein said base station tracks said movement of said motion tracker.

6. The robotic system of claim 5, further comprising a virtual reality environment that processes the motion data corresponding to said movement.

7. The robotic system of claim 6, wherein said virtual reality environment comprises a virtual reality coordinate system.

8. The robotic system of claim 7, wherein said motion tracker or base station transmits said motion data to said virtual reality environment.

9. The robotic system of claim 8, wherein said virtual reality coordinate system is mapped to a physical robotic coordinate system.

10. The robotic system of claim 9, wherein said motion data is mapped to said physical robotic coordinate system.

11. The robotic system of claim 1, wherein said robotic system further comprises an image processing system configured to take one or more images of one or more 3D printed objects.

12. The robotic system of claim 11, wherein said image processing system is configured to use said one or more images of said one or more 3D printed objects to select one or more 3D printed objects and perform at least said movement on said one or more 3D printed objects.

13. A method for processing a 3D printed object, the method comprising:
   obtaining one or more images of the 3D printed object;
   locating the 3D printed object by overlaying at least a portion of a computer model of said 3D printed object on said one or more images of said 3D printed object;
   positioning a VR trained robot based on the location of the 3D printed object, wherein the VR trained robot has been trained based on sensor data from a sensor that captures movement from a user operating at least one physical tool to process one or more 3D printed objects corresponding to the computer model; and
   using the VR trained robot to use one or more tools on said 3D printed object by repeating the movement of the user.

14. The method of claim 13, wherein said robot performs said movement in a physical robotic coordinate system.

15. The method of claim 13, wherein said at least one physical tool is selected from a group consisting of a gripper, brush, gas blower, hammer, blade, spoon, metal file, fish scaler, saw, scissors, wire scraper, drill, pliers, heat gun, screwdriver, and wire stripper.

16. The method of claim 13, wherein said sensor transmits said movement for processing in a VR environment.

17. The method of claim 13, further comprising:
   selecting the 3D printed object for using at least said physical tool on said 3D printed object.

18. The method of claim 17, wherein said one or more images of the 3D printed object are obtained by an image processing system that comprises one or more cameras.

19. The method of claim 18, wherein said selecting comprises comparing said one or more images of said 3D printed object to at least a portion of the computer model of said 3D printed object.

20. The method of claim 13, wherein said sensor comprises a virtual reality motion tracker.

* * * * *